(12) United States Patent
Inoue et al.

(10) Patent No.: US 10,347,956 B2
(45) Date of Patent: Jul. 9, 2019

(54) POWER SOURCE APPARATUS AND WORK MACHINE HAVING THE SAME

(71) Applicants: DENSO CORPORATION, Aichi (JP); KUBOTA CORPORATION, Osaka (JP)

(72) Inventors: Yoshimitsu Inoue, Aichi (JP); Yuki Shimoike, Osaka (JP); Shinichi Kawabata, Osaka (JP); Masahiko Nomura, Osaka (JP); Hiroaki Nakagawa, Osaka (JP)

(73) Assignees: DENSO CORPORATION, Aichi (JP); KUBOTA CORPORATION, Osaka (JP)

( * ) Notice: Subject to any disclaimer, the term of this patent is extended or adjusted under 35 U.S.C. 154(b) by 15 days.

(21) Appl. No.: 15/852,948

(22) Filed: Dec. 22, 2017

(65) Prior Publication Data
US 2018/0226701 A1 Aug. 9, 2018

(30) Foreign Application Priority Data

Feb. 8, 2017 (JP) ................. 2017-021443
Feb. 8, 2017 (JP) ................. 2017-021446

(51) Int. Cl.
*E02F 9/08* (2006.01)
*H01M 2/10* (2006.01)
(Continued)

(52) U.S. Cl.
CPC ....... *H01M 10/6557* (2015.04); *E02F 9/0858* (2013.01); *H01M 2/1077* (2013.01);
(Continued)

(58) Field of Classification Search
CPC ........... H01M 10/6557; H01M 10/613; H01M 10/6563; H01M 2/1077; H01M 2220/20; E02F 9/0858; Y10S 903/907
(Continued)

(56) References Cited

U.S. PATENT DOCUMENTS

2007/0026300 A1  2/2007 Lee et al.
2011/0223452 A1  9/2011 Yoshida et al.
(Continued)

FOREIGN PATENT DOCUMENTS

EP  1376733  1/2004
EP  1753070  2/2007
(Continued)

OTHER PUBLICATIONS

Extended European Search Report in respect to European Application No. 17210658.5, dated Feb. 14, 2018.

*Primary Examiner* — Eduardo Colon Santana
*Assistant Examiner* — Devon A Joseph
(74) *Attorney, Agent, or Firm* — Greenblum & Bernstein, P.L.C.

(57) ABSTRACT

A power source apparatus includes a battery module including a plurality of battery cells, a housing forming a housing chamber to house and arrange a plurality of the battery modules in parallel, a blower to blow air, an inter-module path formed between the battery modules adjacent to each other; and an inter-cell path formed between the battery cells adjacent to each other. The housing includes an intake portion to take the air into the housing chamber, and a sending portion to send the air from the housing chamber. The inter-module path has a first inter-module path serving as a path into which the air is introduced. The sending portion is separated, adjacent to at least one battery module, from the first inter-module path such that the air flows in the (Continued)

inter-cell paths of a plurality of the battery modules arranged next to the first inter-module path and adjacent each other.

19 Claims, 17 Drawing Sheets

(51) Int. Cl.
    *H01M 10/613*    (2014.01)
    *H01M 10/625*    (2014.01)
    *H01M 10/6557*    (2014.01)
    *H01M 10/6561*    (2014.01)
    *H01M 10/6563*    (2014.01)

(52) U.S. Cl.
    CPC ....... *H01M 10/613* (2015.04); *H01M 10/625* (2015.04); *H01M 10/6561* (2015.04); *H01M 10/6563* (2015.04); *H01M 2220/20* (2013.01); *Y10S 903/907* (2013.01)

(58) Field of Classification Search
    USPC .......................................................... 318/139
    See application file for complete search history.

(56) References Cited

U.S. PATENT DOCUMENTS

| | | | |
|---|---|---|---|
| 2016/0093929 A1* | 3/2016 | Obasih | H01M 10/0525 |
| | | | 429/120 |
| 2016/0197324 A1* | 7/2016 | DeKeuster | H01M 2/305 |
| | | | 429/82 |
| 2017/0054124 A1* | 2/2017 | Yoon | H01M 10/6556 |
| 2017/0288286 A1* | 10/2017 | Buckhout | H01M 2/1077 |
| 2018/0029494 A1* | 2/2018 | Hinterberger | H02J 7/0014 |
| 2018/0040933 A1* | 2/2018 | Inoue | H01M 2/10 |

FOREIGN PATENT DOCUMENTS

| | | |
|---|---|---|
| JP | 2006-024510 | 1/2006 |
| JP | 2015-216070 | 12/2015 |

* cited by examiner

POWER SOURCE APPARATUS AND WORK MACHINE HAVING THE SAME

CROSS-REFERENCE TO RELATED APPLICATIONS

The present application claims priority under 35 U.S.C. § 119 to Japanese Patent Application No. 2017-021443, filed Feb. 8, 2017, and to Japanese Patent Application No. 2017-021446, filed Feb. 8, 2017. The contents of these applications are incorporated herein by reference in their entirety.

BACKGROUND OF THE INVENTION

Field of the Invention

The present invention relates to a power source apparatus and to a work machine having the power source apparatus.

Discussion of the Background

Japanese Patent Application Publication No. 2015-216070 discloses a power source apparatus (a battery pack).

The power source apparatus disclosed in Japanese Patent Application Publication No. 2015-216070 includes a plurality of battery modules, a blower configured to blow air, and a chassis configured to store the plurality of battery modules. The battery module forms a plurality of ventilation holes on an upper surface of the battery module and on the lower surface, the ventilation holes being provided for passing the air through clearances between the battery cells constituting the battery module. The air blown form the blower passes through the ventilation holes formed on the upper surface of the battery module and flows into the inter-cell path, and then passes through the ventilation holes formed on the lower surface of the battery module and is exhausted outside from the battery module. In this manner, the battery module is cooled.

The power source apparatus disclosed in Japanese Patent Application Publication No. 2015-216070 includes a plurality of batteries (battery modules), a blower configured to blow air, and a chassis configured to store the plurality of batteries. The battery module forms a plurality of ventilation holes on an upper surface of the battery and on the lower surface, the ventilation holes being provided for passing the air in the batteries. The blower is arranged below the batteries. A path (a side portion path) into which the air blown from the blower flows is formed between a side surface of the battery and a side wall surface of a chassis. Another path (an upper portion path) into which the air having passed through the first path flows is formed between an upper surface of the battery and an upper wall surface of the chassis. The air blown from the blower passes through the ventilation hole (an upper ventilation holes) formed on the upper surface of the battery and flows into the battery after flowing in the side portion path and flowing into the upper portion path, and then passes through the ventilation holes (a lower ventilation holes) formed on the lower surface of the battery and is exhausted outside from the battery. In this manner, the battery module is cooled.

SUMMARY OF THE INVENTION

A power source apparatus of the present invention includes a battery module including a plurality of battery cells, a housing forming a housing chamber to house and arrange a plurality of the battery modules in parallel, a blower to blow air, an inter-module path formed between the battery modules adjacent to each other; and an inter-cell path formed between the battery cells adjacent to each other. The housing includes an intake portion to take the air into the housing chamber, the air being blown from the blower, and a sending portion to send the air from the housing chamber, the air being taken from the intake portion and passing through the inter-module path and the inter-cell path. The inter-module path has a first inter-module path serving as a path into which the air is introduced, the air being taken from the intake portion and not yet having passed through the inter-cell path. The sending portion is separated, adjacent to at least one battery module, from the first inter-module path such that the air flows in the inter-cell paths of a plurality of the battery modules arranged next to the first inter-module path and adjacent each other.

Another power source apparatus of the present invention includes a battery module including a plurality of battery cells, a housing forming a housing chamber to house and arrange a plurality of the battery modules in parallel, a blower to blow air, an inter-module path formed between the battery modules adjacent to each other, and an inter-cell path formed between the battery cells adjacent to each other. The housing includes an intake portion to take the air into the housing chamber, the air being blown from the blower, and a sending portion to send the air from the housing chamber, the air being taken from the intake portion and passing through the inter-module path and the inter-cell path. The inter-module path has a second inter-module path serving as a path into which the air is introduced, the air being introduced to the sending portion after passing through the inter-cell path. The intake portion is separated, adjacent to at least one battery module, from the second inter-module path such that the airs having passed through the inter-cell path of each of a plurality of the battery modules arranged next to the first inter-module path and adjacent each other are confluent and introduced to the intake portion.

Further another power source apparatus of the present invention includes a battery module including a plurality of battery cells, a housing forming a housing chamber to house and arrange a plurality of the battery modules in parallel, a blower to blow air, an inter-module path formed between the battery modules adjacent to each other, and an inter-cell path formed between the battery cells adjacent to each other. The housing includes an intake portion to take the air into the housing chamber, the air being blown from the blower, and a sending portion to send the air from the housing chamber, the air being taken from the intake portion and passing through the inter-module path and the inter-cell path. The inter-module path has a first inter-module path serving as a path into which the air is introduced, the air being taken from the intake portion and not yet having passed through the inter-cell path, and a second inter-module path serving as a path into which the air is introduced, the air being introduced to the sending portion after passing through the inter-cell path. The intake portion includes a first intake portion disposed on a side opposed to the sending portion and facing the first inter-module path. The sending portion sends the air taken from the first intake portion and passing through the first inter-module path, the inter-cell path, and the second inter-module path in turn.

A working machine of the present invention includes a machine body, an operation device disposed on the machine body, a rotating electrical apparatus to generate a motive power used for driving the operation device, and a power source apparatus to supply an electric power to the rotating electrical apparatus, the power source apparatus having a configuration mentioned above.

Further another power source apparatus of the present invention includes a plurality of batteries, a housing forming a housing chamber to house the batteries and having an intake portion to take air into the housing chamber and a sending portion to send air, a chassis having an inner space surrounded by a plurality of wall surfaces including a first lateral wall surface and a second lateral wall surface and storing the batteries in the inner space. The first lateral wall surface is arranged on a first side of the batteries. The second lateral wall surface is arranged on a side opposite to the first side of the batteries and being opposed to the first lateral wall surface, The power source apparatus includes a blower arranged between the second lateral wall surface and the batteries and configured to blow the air that is taken from the intake portion. At least a part of the sending portion is arranged separating from the blower in a perpendicular direction that is perpendicular to a direction of arrangements of the blower and the batteries so as not to be overlapped with the blower in the direction of arrangements.

Another working machine of the present invention includes a machine body, an operation device disposed on the machine body, a rotating electrical apparatus to generate a motive power used for driving the operation device, and a power source apparatus to supply an electric power to the rotating electrical apparatus, the power source apparatus having a configuration mentioned above.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
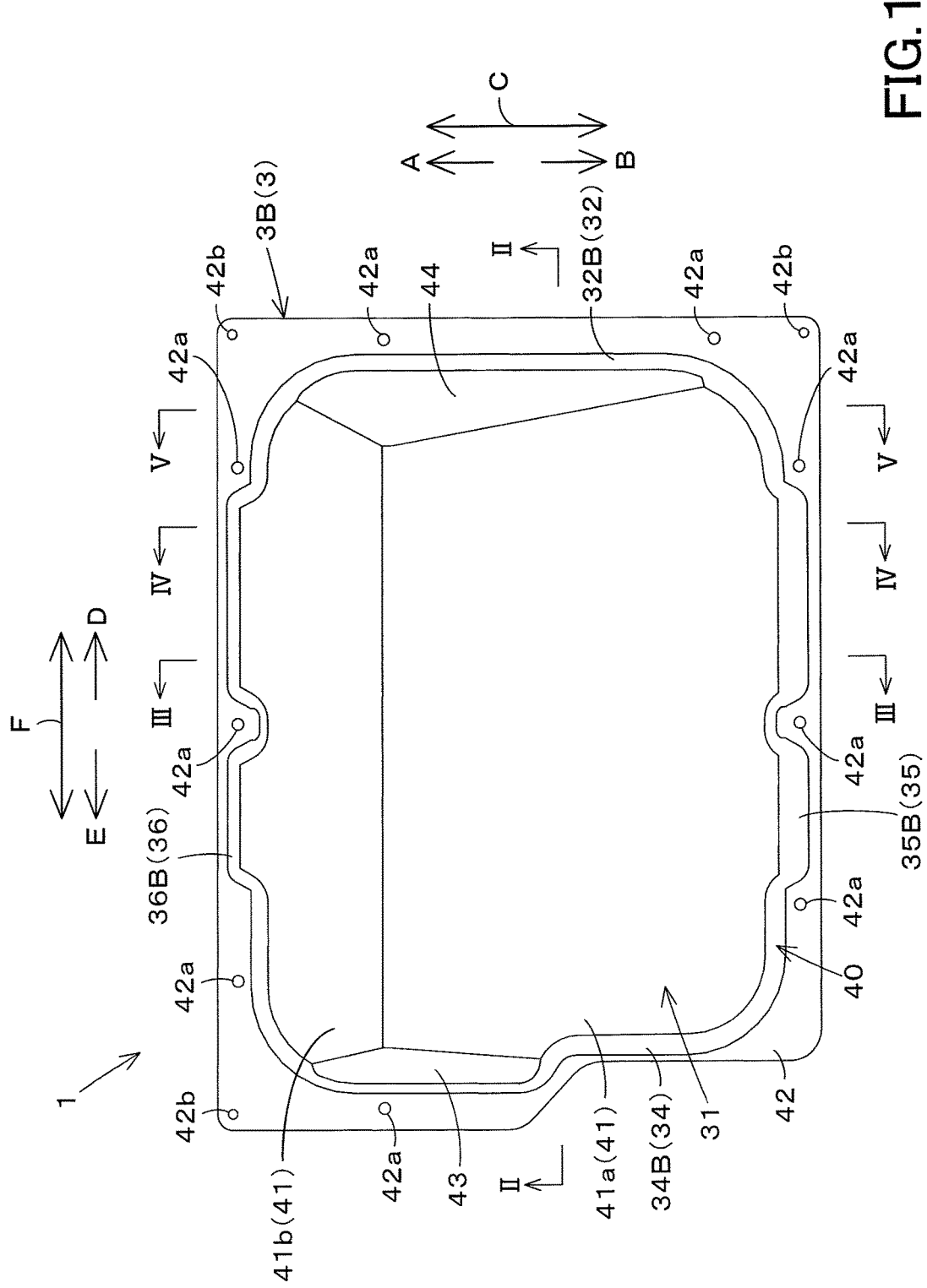
FIG. 1 is a view illustrating a plan view of a power source apparatus according to an embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, embodiments of the present invention will be described below, the embodiments explaining a power source apparatus and a working machine having the power source apparatus.

The power source apparatus will be explained first.

As shown in FIG. 1 to FIG. 6, a power source apparatus 1 includes a battery 2, a chassis 3, a housing 4, a blower 5, and a heat exchanger 6. In the embodiment, the battery 2, the housing 4, the blower 5, and the heat exchanger 6 are stored in an internal space of the chassis 3.

For convenience of the explanation, regarding a direction of arrangement of the power source apparatus 1, a direction of arrangement of the power source apparatus 1 mounted on a working machine 100 described below is referred to as a reference direction. In particular, a direction indicated by an arrowed line A in the drawings is referred to as a front direction, a direction indicated by an arrowed line B in the drawings is referred to as a rear direction, a direction indicated by an arrowed line C in the drawings is referred to as a front to rear direction (or a rear to front direction), a direction indicated by an arrowed line D in the drawings is referred to as a right direction, a direction indicated by an arrowed line E in the drawings is referred to as a left direction, and a direction indicated by an arrowed line F in the drawings is referred to as a chassis width direction (a lateral direction) or a right to left direction (or a left to right direction).

In addition, a direction indicated by an arrowed line G in the drawings is referred to as an upper direction, a direction indicated by an arrowed line H in the drawings is referred to as a lower direction, and a direction indicated by an arrowed line I in the drawings is referred to as a vertical direction or an upper to lower direction (or a lower to upper direction). However, the direction of arrangement of the power source apparatus 1 is not restricted by the directions indicated in the drawings, and may be arbitrarily changed in consideration of an installation place of the power source apparatus 1 and of a relation between the peripheral devices.

<Battery>

As shown in FIG. 2 to FIG. 7, and the like, the power source apparatus 1 includes a plurality of batteries 2. The batteries 2 may be the battery cells, and may be the battery module including a plurality of the battery cells (also referred to as the battery stack). In the embodiment, the batteries 2 are the battery module 7.

Figure 3:
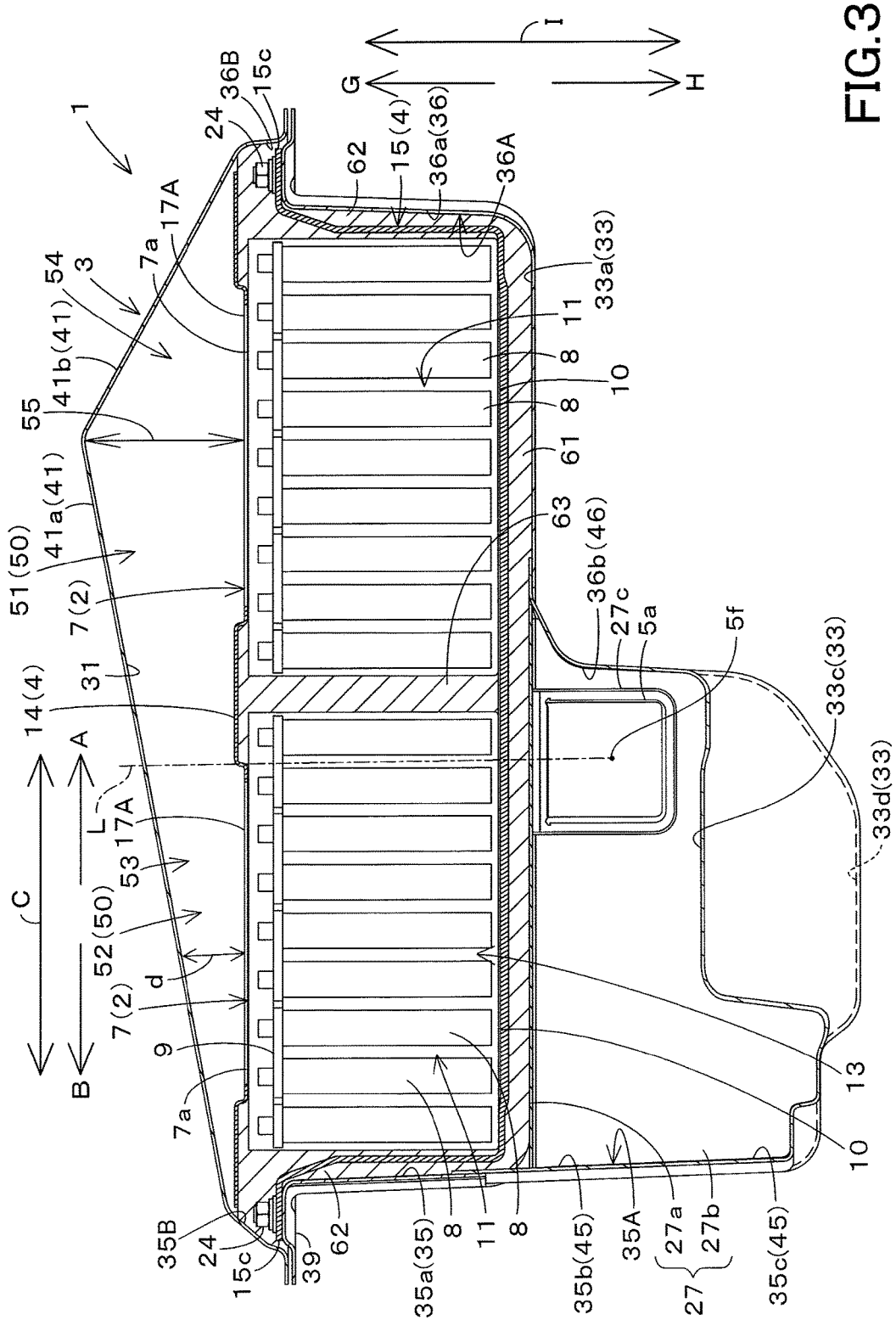
FIG. 3 is a cross-sectional view in III-III of FIG. 1 and FIG. 2.
Figure 4:
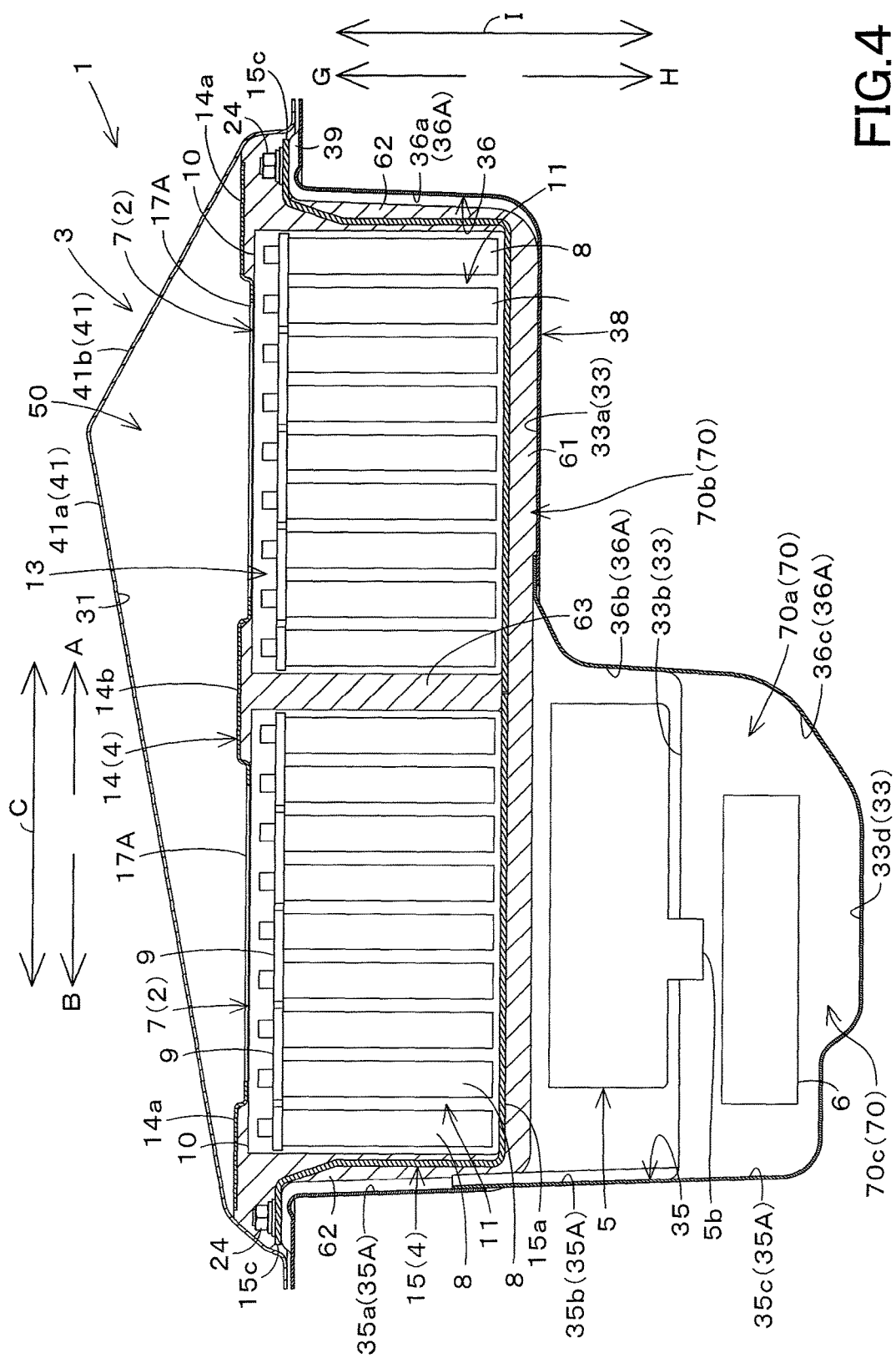
FIG. 4 is a cross-sectional view in IV-IV of FIG. 1 and FIG. 2.
Figure 5:
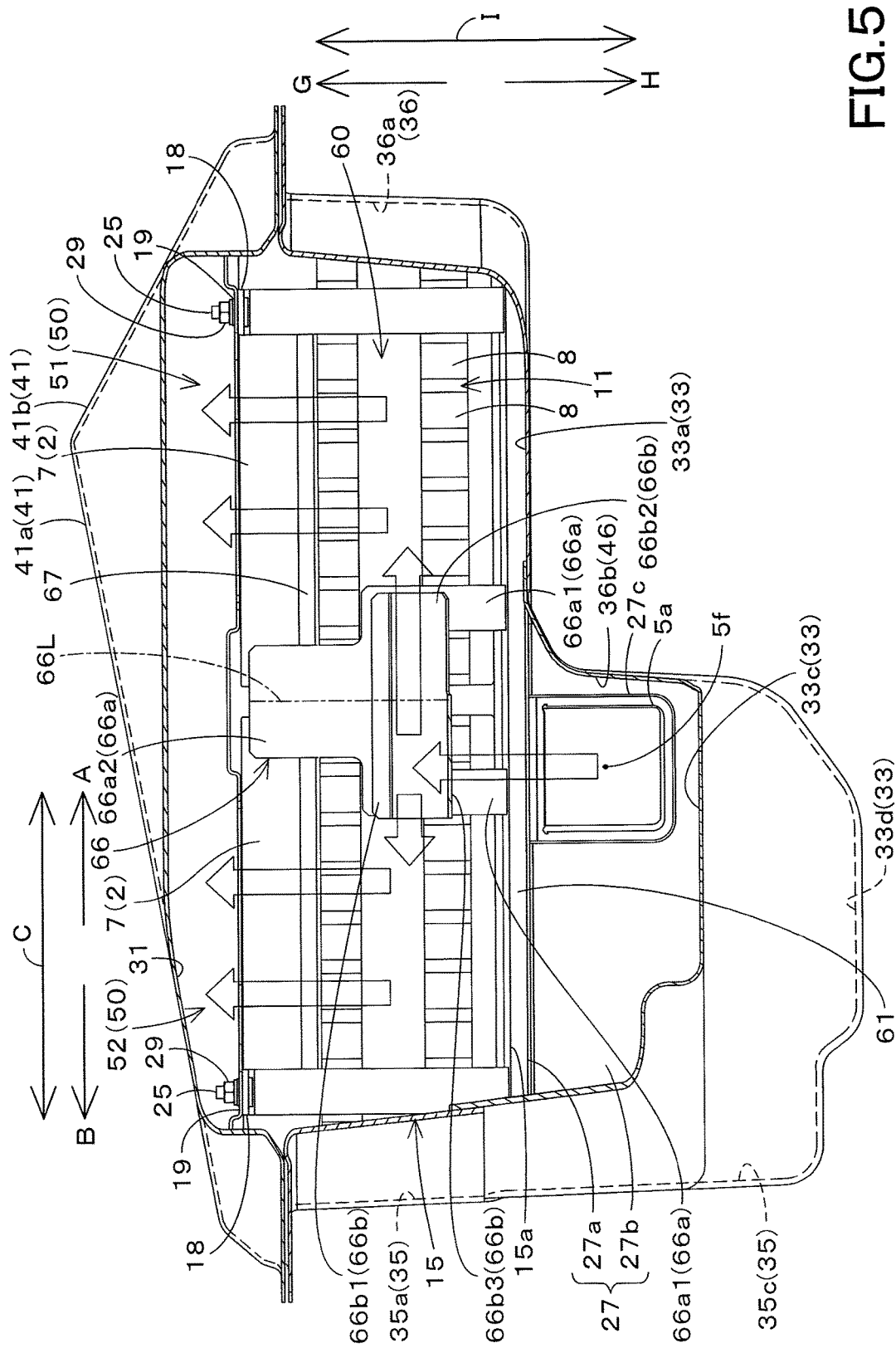
FIG. 5 is a cross-sectional view in V-V of FIG. 1 and FIG. 2.

As shown in FIG. 3 to FIG. 5 and the like, the battery module 7 includes a plurality of the battery cells 8. In particular, the battery module 7 is constituted of the plurality of battery cells 8 that are integrated and electrically connected in series. Each of the battery cells 8 is for example a nickel-metal hydride secondary battery, a lithium ion secondary battery, an organic radical battery, or the like. Each of the battery cell 8 has a flattened rectangular shape that has a length in one direction (a thickness direction) shorter than a length in the other direction.

Figure 6:
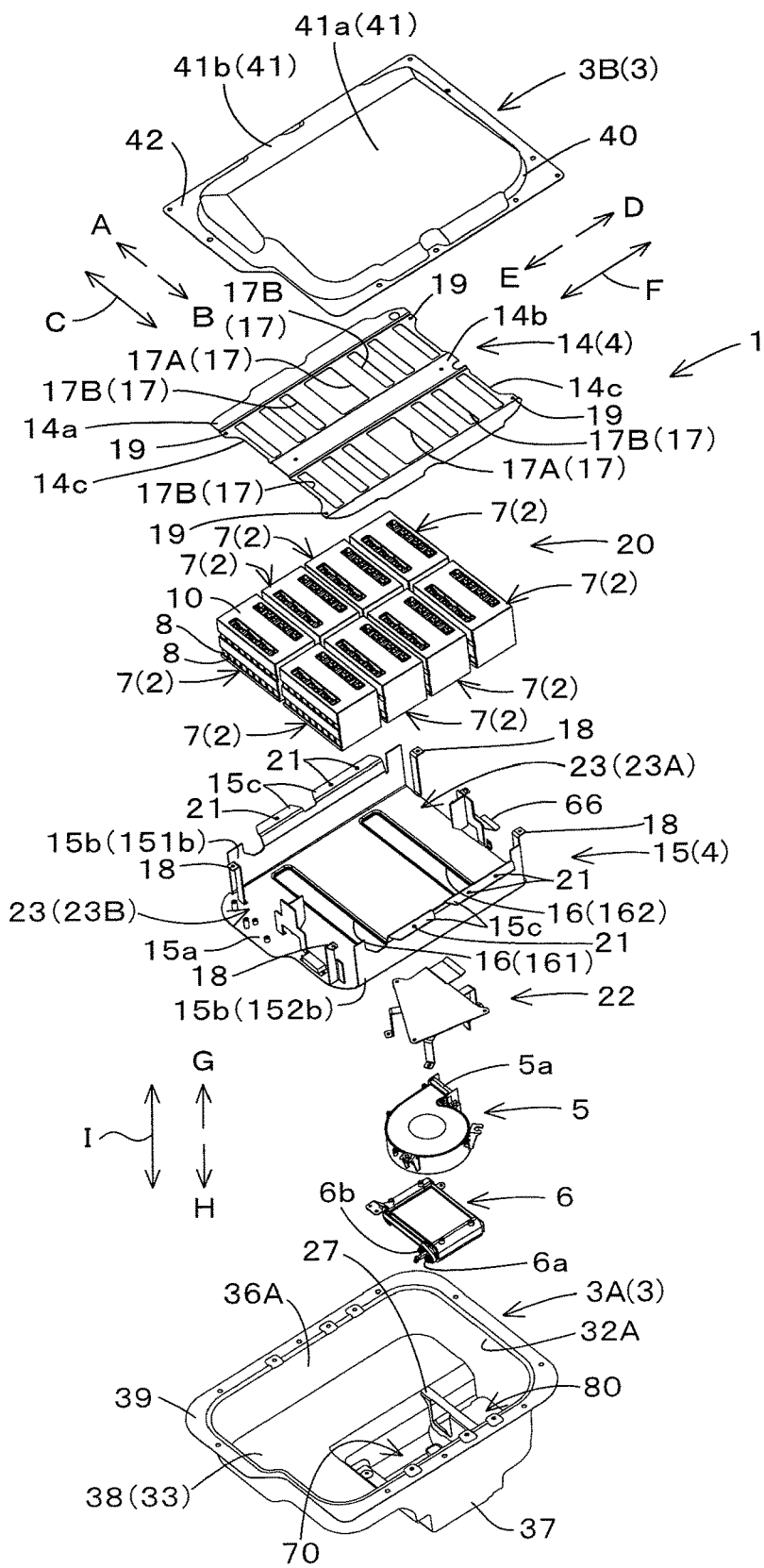
FIG. 6 is an exploded perspective view of the power source apparatus according to the embodiment.
Figure 7:
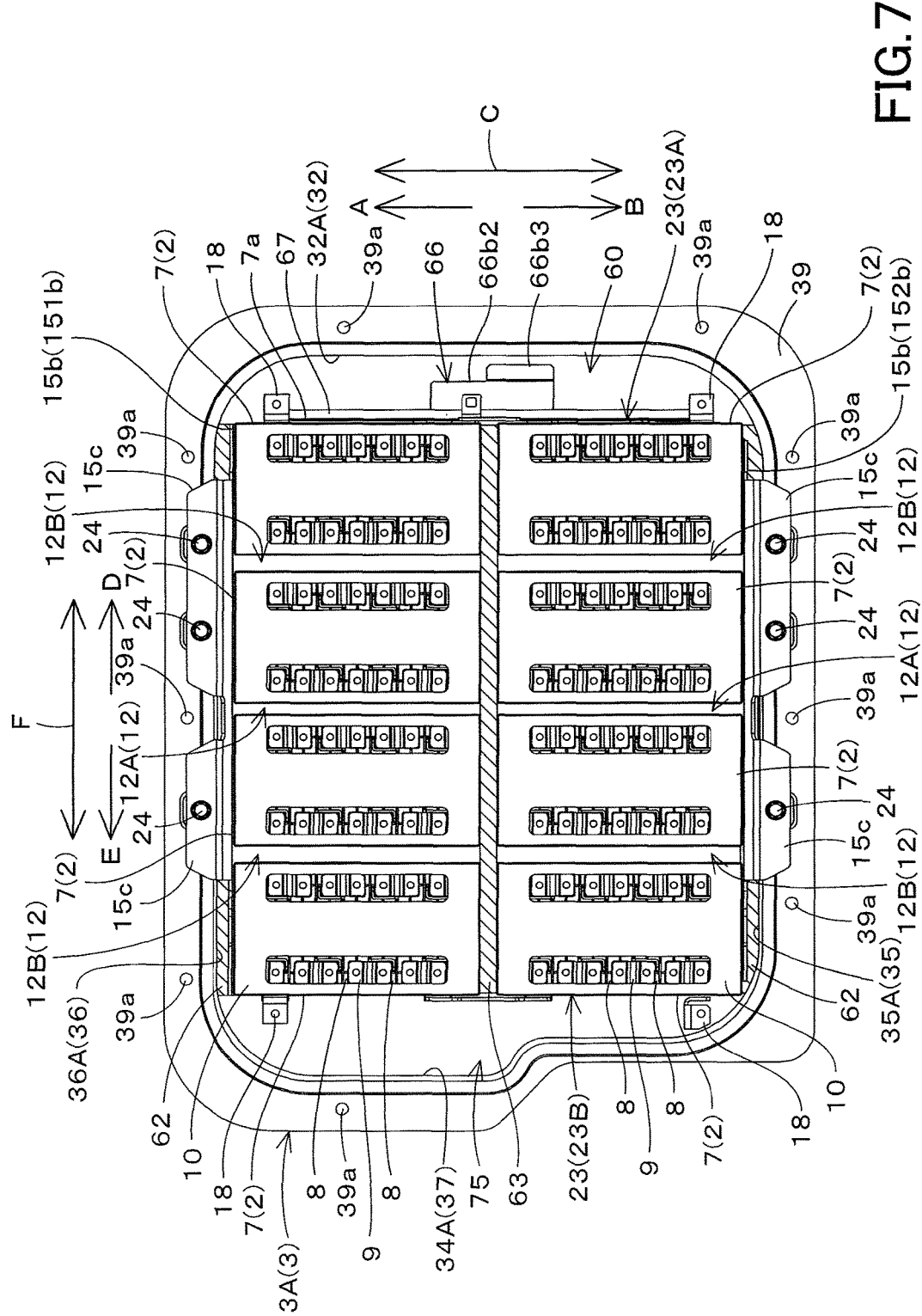
FIG. 7 is a plan view illustrating the power source apparatus according to the embodiment under a state where a lid is removed.

As shown in FIG. 3, FIG. 6, and FIG. 7, the plurality of battery cells 8 are arranged in parallel (that is, stacked) and housed in an external case 10. The external case 10 is for example constituted of metals or resins having the electrical insulation property. In the embodiment, the external case 10 has a substantially-rectangular shape. Each of a front surface, a rear surface, and a lower surface of the external case 10 is constituted of a closed surface (a surface having no opening) that does not allow the air to pass through (to penetrate).

A left surface and a right surface of the external case 10 are opening surfaces allowing the air to pass through, and communicate with an inter-cell path 11 described below. An opening is formed on an upper surface of the external case 10, the opening being provided for exposing a bus bar 9 described below. However, the opening allows little (substantially does not allow) the air to pass through.

A direction of parallel arrangement of the battery cells 8 (a stacking direction) is the thickness direction of the battery cell 8. In the embodiment, the direction of parallel arrangement of the battery cells 8 corresponds to the front to rear direction C (the chassis width direction). As shown in FIG. 3 to FIG. 5, the inter-cell path 11 is formed between the battery cells 8 adjacent to each other in the front to rear direction C that is the direction of parallel arrangement (the stacking direction), the inter-cell path 11 being configured to allow the air flow. The battery cell 8 includes electrode terminals (a positive terminal and a negative terminal) projecting from the external case 10.

The bus bar 9 electrically connects between the heteropolar terminals of the battery cells 8 adjacent to each other, that is, the electrode terminals projecting from the external case 10 adjacent to each other. The bus bar 9 is connected to the electrode terminal by the welding, the screw, or the like. The terminals arranged on both sides of the plurality of the battery cells 8 receives an electric power from outside and discharges the electric power to other electric apparatuses, the plurality of the battery cells 8 being electrically connected to each other in the above-mentioned manner.

The power source apparatus 1 includes one or a plurality of battery modules 7. The power source apparatus 1 according to the present embodiment includes a plurality of the battery modules 7. That is, the power source apparatus 1 according to the embodiment includes the plurality of battery modules 7 as the plurality of batteries 7. As shown in FIG. 6, FIG. 7, the plurality of battery modules 7 are arranged in both of the right to left direction F and in the front to rear direction C.

For convenience of the explanation, the right to left direction F may be referred to as "a first parallel arrangement direction", and the front to rear direction C may be referred to as "a second parallel arrangement direction". In addition, the plurality of battery modules 7 may be collectively referred to as "a module assembly 20".

In the embodiment, the number of the battery modules 7 is eight. Eight battery modules 7 are arranged such that four battery modules 7 are arranged in the right to left direction F (the first parallel arrangement direction) and two battery modules are arranged in the front to rear direction C (the second parallel arrangement direction). However, the number of the battery modules 7, the number of the battery modules 7 arranged in the first parallel arrangement direction, and the number of the battery modules 7 arranged in the second parallel arrangement direction may be changed on the basis of the specifications or the like required for the power source apparatus 1.

Figure 2:
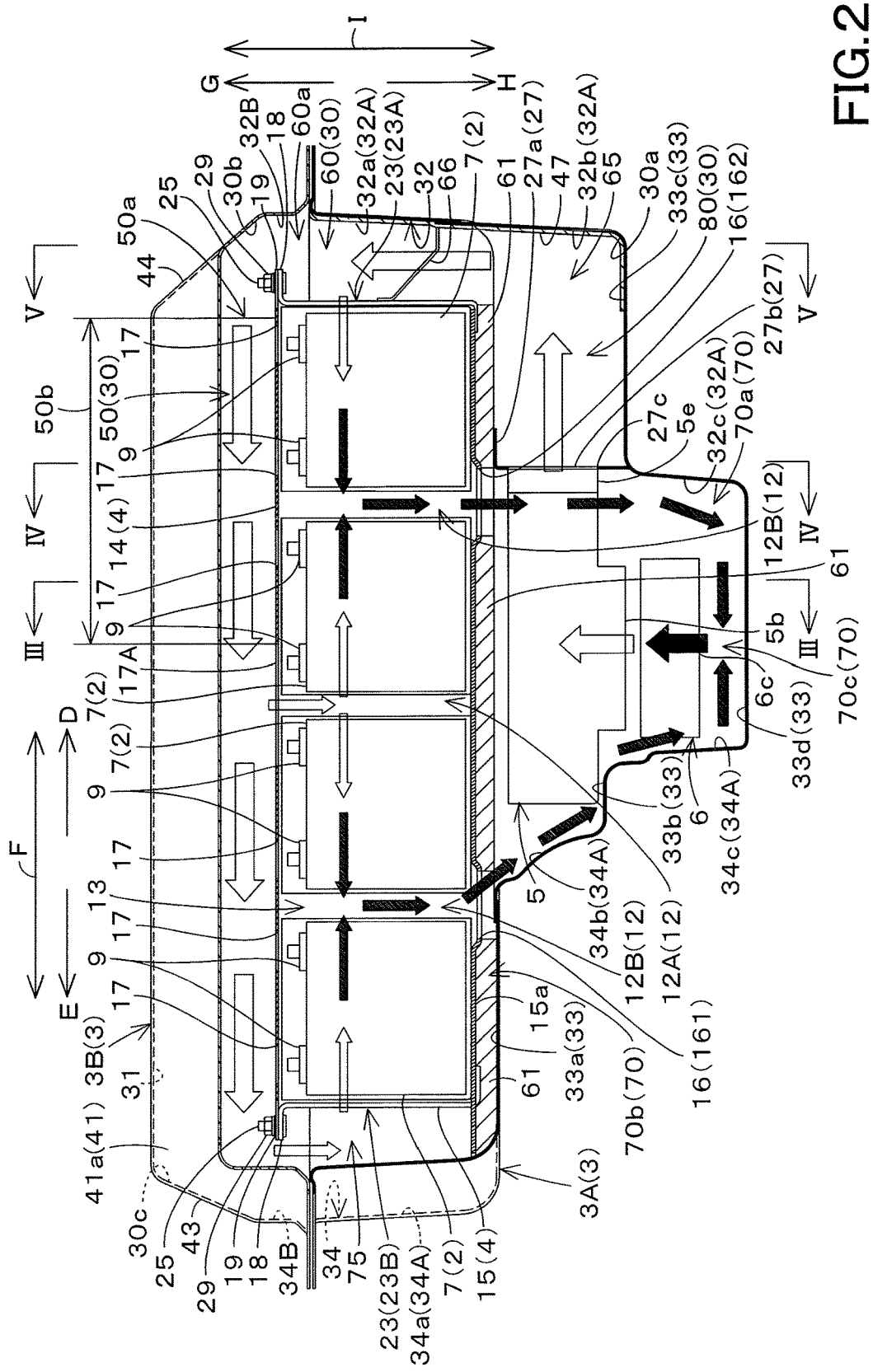
FIG. 2 is a cross-sectional view in II-II of FIG. 1.

As shown in FIG. 2 and FIG. 7, an inter-module path 12 is formed between the battery modules 7 adjacent to each other in the right to left direction F (the first parallel arrangement direction), the inter-module path 12 being configured to allow the air flow.

The inter-module path 12 includes a first inter-module path 12A and a second inter-module path 12B. The first inter-module path 12A and the second inter-module path 12B are extend in the upper to lower direction. The first inter-module path 12A and the second inter-module path 12B are alternately arranged in the first parallel arrangement direction (the right to left direction F). In the present embodiment, the first inter-module path 12A is arranged in a center of the battery module 7 in the first parallel arrangement direction (the right to left direction F).

The second inter-module path 12B is arranged on a position separating from the first inter-module path 12A and disposes one battery module 7 between the first inter-module path 12A and the second inter-module path 12B. The present embodiment employs two second inter-module paths 12B. One of the second inter-module paths 12B is arranged on a position separating rightward from the first inter-module path 12A (arranged on a second wall surface 32 side) and disposes one battery module 7 between the first inter-module path 12A and the second inter-module path 12B. The other one of the second inter-module paths 12B is arranged on a position separating leftward from the first inter-module path 12A (arranged on a fourth wall surface 34 side) and disposes one battery module 7 between the first inter-module path 12A and the second inter-module path 12B.

The first inter-module path 12A is a path into which the air is introduced, the air not having passed through the inter cell path 11 yet (the air not having cooled the battery cells 8 yet). The second inter-module path 12B is a path into which the air is introduced, the air having passed through the inter cell path 11 already (the air having cooled the battery cells 8 already). The flow of air in the inter-cell path 11 and in the inter-module path 12 will be explained in detail below.

The number of the inter-module paths 12 (the first inter-module paths 12A and the second inter-module paths 12B) are determined based on the number of the battery modules 7 arranged in the first parallel arrangement direction (the right to left direction F). That is, the number of the inter-module paths 12 is increased and decreased in accordance with the increasing and decreasing of the number of the battery modules 7 arranged in the first parallel arrangement direction.

<Chassis (Outline)>

The chassis 3 forms an inner space that is surrounded by a plurality of wall surfaces (inner wall surfaces) and tightly closed. The batteries 2 (the battery modules 7) and the like are stored in the inner space. As shown in FIG. 1 to FIG. 5 and the like, the plurality of wall surfaces includes a first wall surface 31, a second wall surface 32, a third wall surface 33, a fourth wall surface 34, a fifth wall surface 35, and a sixth wall surface 36.

The first wall surface 31 is arranged on an upper side that is a first side (another side) of the battery 2 (the battery module 7), and is opposed to the first side of the battery module 7. The second wall surface 32, the fourth wall surface 34, the fifth wall surface 35, and the sixth wall surface 36 are connected to the first wall surface 31 and extend downward, that is, toward a second side (one side) of the battery module 7 (the blower 5 side). The third wall surface 33 is arranged on a lower side that is the second side (the one side) opposite to the first side of the battery module 7, and is opposed to the first wall surface 31.

The first wall surface (also referred to as a first lateral wall surface) 31 constitutes an inner wall surface disposed on an upper side of the chassis 3. The second wall surface 32 constitutes an inner wall surface disposed on a right side of a lid 3B. The third wall surface (also referred to as a second lateral wall surface) 33 is opposed to the first wall surface 31 and constitutes a lower wall surface of the chassis 3. The fourth wall surface 34 is opposed to the second wall surface 32 and constitutes an inner wall surface disposed on a left side of the lid 3B. The fifth wall surface (also referred to as a second vertical wall surface) 35 constitutes an inner wall surface disposed on a rear side of the chassis 3. The sixth wall surface (also referred to as a first vertical wall surface or a vertical wall surface) 36 is opposed to the fifth wall surface 35 and constitutes an inner wall surface disposed on a front side of the lid 3B. The wall surfaces adjacent to each other are connected by a corner portion formed of a curved surface.

<Chassis (Details)>

A configuration of the chassis 3 will be explained below in detail.

As shown in FIG. 1 to FIG. 6 and the like, the chassis 3 is constituted of a main body 3A and the lid 3B.

A configuration of the main body 3A will be explained first.

Figure 8:
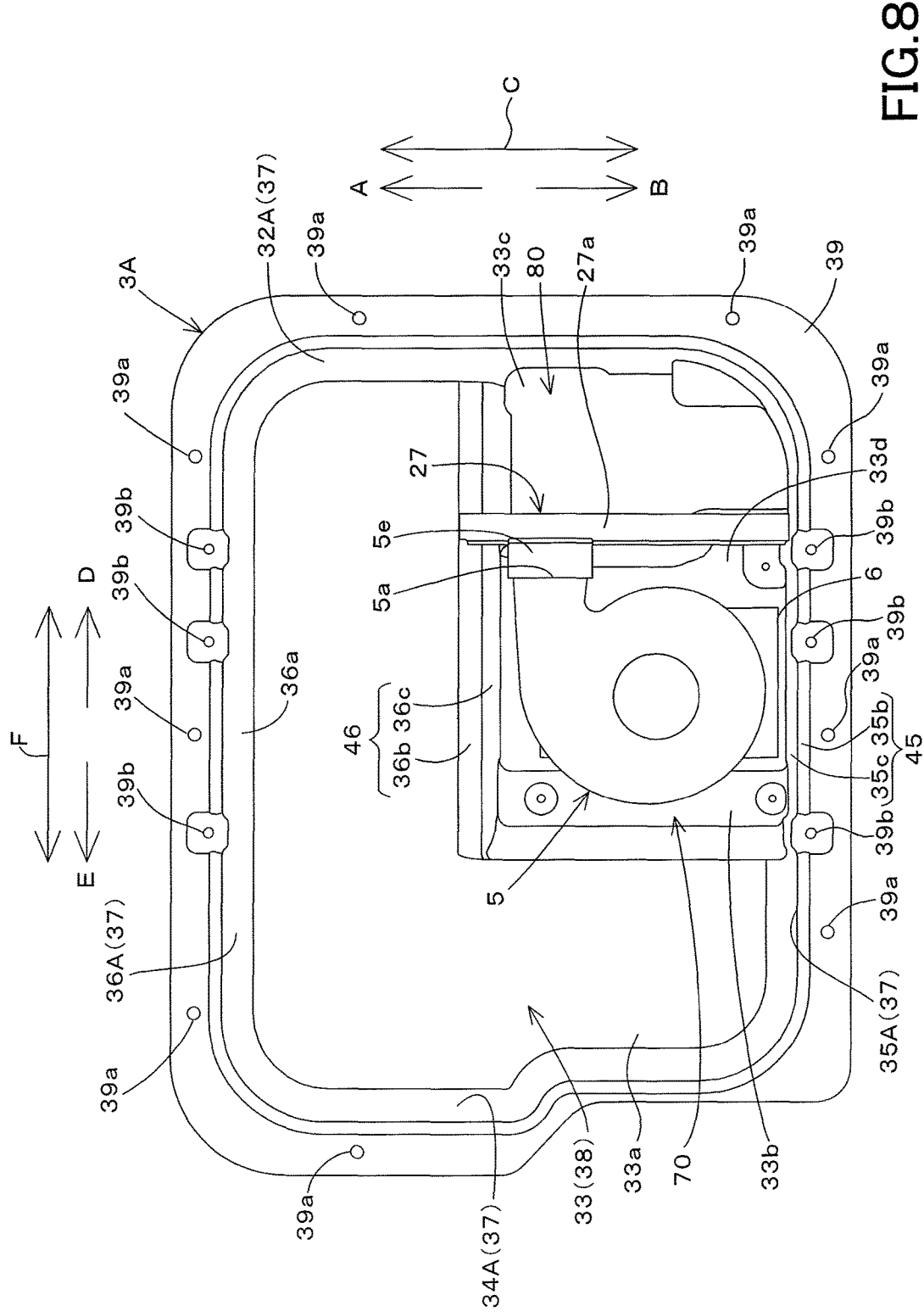
FIG. 8 is a plan view illustrating a main body of a chassis, a blower, a heat exchanger, and a separating plate according to the embodiment.
Figure 9:
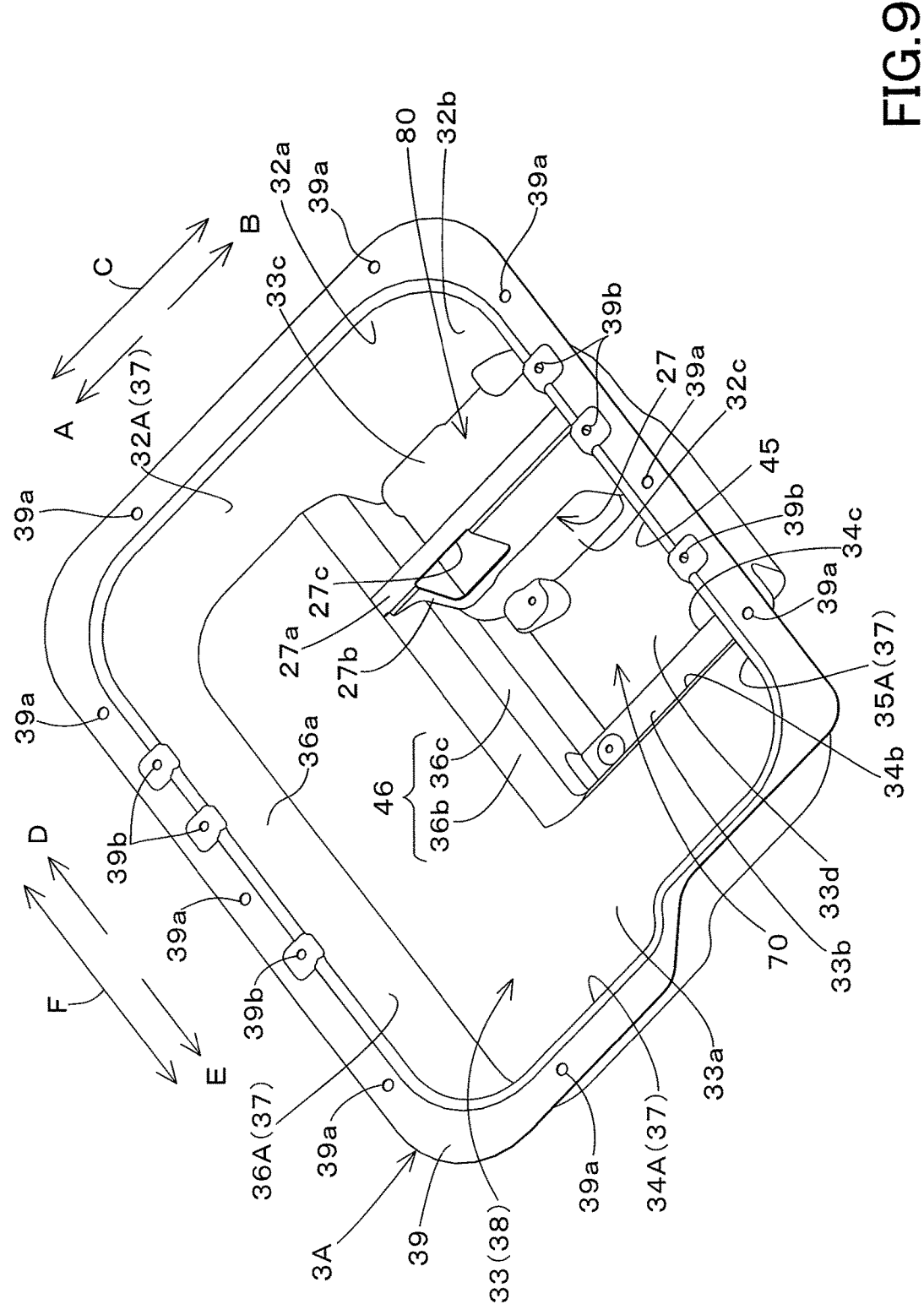
FIG. 9 is a perspective view illustrating the main body of the chassis and the separating plate each seen downwardly from the left rear according to the embodiment.

As shown in FIG. 6, FIG. 8, FIG. 9, and the like, the main body 3A includes a side wall 37, a bottom wall 38, and a flange portion 39.

The side wall 37 stands up from an outer edge of the bottom wall 38, and is constituted to have a shape of substantially-rectangular frame in a top view. The side wall 37 has four side walls (a front side wall 36A, a rear side wall 35A, a left side wall 34A, and a right side wall 32A) respectively constituting a front side wall, a rear side wall, a left side wall, and a right side wall of the main body 3A.

The right side wall 32A is arranged on a right portion of the main body 3A. An inner surface of the right side wall 32A is oriented to face leftward, and an outer surface of the right side wall 32A is oriented to face rightward. The left side wall 34A is arranged on a left portion of the main body 3A. An inner surface of the left side wall 34A is oriented to face rightward, and an outer surface of the left side wall 34A is oriented to face leftward. The rear side wall 35A is arranged on a rear portion of the main body 3A. An inner surface of the rear side wall 35A is oriented to face forward, and an outer surface of the rear side wall 35A is oriented to face backward. The front side wall 36A is arranged on a front portion of the main body 3A. An inner surface of the front side wall 36A is oriented to face backward, and an outer surface of the front side wall 36A is oriented to face forward.

As shown in FIG. 2, the right side wall 32A has a right upper portion 32a, a right intermediate portion 32b, and a right lower portion 32c. The right upper portion 32a is positioned on an upper portion of the main body 3A (on an upper portion of the right side wall 32A). The right intermediate portion 32b is extended downward from a rear portion of the right upper portion 32a, and forms a wall surface continuously connected to the right upper portion 32a. The right lower portion 32c is positioned leftward below the right intermediate portion 32b, and is connected to the right intermediate portion 32b by a second bottom intermediate portion 33c of the bottom wall 38. The second bottom intermediate portion 33c will be described below.

As shown in FIG. 2, the left side wall 34A has a left upper portion 34a, a left intermediate portion 34b, and a left lower portion 34c. The left upper portion 34a is positioned on an upper portion of the main body 3A (on an upper portion of the left side wall 34A). The left intermediate portion 34b is positioned rightward below the left upper portion 34a, and is connected to the left upper portion 34a by a bottom upper portion 33a of the bottom wall 38. The bottom upper portion 33a will be described below. The left lower portion 34c is positioned rightward below the left intermediate portion 34b, and is connected to the left intermediate portion 34b by a first bottom intermediate portion 33b of the bottom wall 38. The first bottom intermediate portion 33b will be described below.

As shown in FIG. 4 and FIG. 7, the rear side wall 35A has a rear upper portion 35a, a rear intermediate portion 35b, and a rear lower portion 35c. The rear upper portion 35a, the rear intermediate portion 35b, the rear lower portion 35c form a wall surface sequentially continued in the upper to lower direction. A left end of the rear upper portion 35a is connected to a left upper portion 34a of the left side wall 34A. A right end of the rear upper portion 35a is connected to a right upper portion 32a of the right side wall 32A.

The rear intermediate portion 35b is extended downward from a right portion of the rear upper portion 35a. The left end of the rear intermediate portion 35b is connected to the left intermediate portion 34b of the left side wall 34A. The right end of the rear intermediate portion 35b is connected to the right intermediate portion 32b of the right side wall 32A. The rear lower portion 35c is extended downward from a position close to a left portion of the rear intermediate portion 35b. The left end of the rear lower portion 35c is connected to the left lower portion 34c of the left side wall 34A. The right end of the rear lower portion 35c is connected to the right lower portion 32c of the right side wall 32A.

As shown in FIG. 4, the front side wall 36A has a front upper portion 36a, a front intermediate portion 36b, and a front lower portion 36c. A left end of the front upper portion 36a is connected to the left upper portion 34a of the left side wall 34A. A right end of the front upper portion 36a is connected to the right upper portion 32a of the right side wall 32A. The front intermediate portion 36b is positioned backward below the front upper portion 36a, and is connected to the front upper portion 36a by a bottom upper portion 33a of the bottom wall 38. The bottom upper portion 33a will be explained below.

A left end of the front intermediate portion 36b is connected to the left intermediate portion 34b of the left side wall 34A. A right end of the front intermediate portion 36b is connected to the right intermediate portion 32b of the right side wall 32A. The front lower portion 36c is extended downward from a position close to a left portion of the front intermediate portion 36b. The front lower portion 36c forms a curved surface that shifts backward (toward the rear side wall 35A side) downwardly. A left end of the front lower portion 36c is connected to the left lower portion 34c of the left side wall 34A. A right end of the front lower portion 36c is connected to the right lower portion 32c of the right side wall 32A.

As shown in FIG. 8, FIG. 9, the bottom wall 38 is connected to a lower end of the side wall 37 (the front side wall 36A, the rear side wall 35A, the left side wall 34A, and the right side wall 32A). An inner surface of the bottom wall 38 is oriented to face upward, and an outer surface of the bottom wall 38 is oriented to face downward. As shown in FIG. 2 and FIG. 9, the bottom wall 38 has a bottom upper portion 33a, a first bottom intermediate portion 33b, a second bottom intermediate portion 33c, and a bottom lower portion 33d.

As shown in FIG. 8, the bottom upper portion 33a is formed to have a substantially-L shape in a top view. The bottom upper portion 33a is connected to the following lower ends: a lower end of a front side of the right upper portion 32a of the right side wall 32A (a lower end of a portion that is not continuously connected to the right intermediate portion 32b), a lower end of the left upper portion 34a of the left side wall 34A, a lower end of a left side of the rear upper portion 35a of the rear side wall 35A (a lower end of a portion that is not continuously connected to the rear intermediate portion 35b), and a lower end of the front side wall 36A.

As shown in FIG. 2 and FIG. 9, the first bottom intermediate portion 33b is positioned below the bottom upper portion 33a. The first bottom intermediate portion 33b is connected to the following end portions: a lower end of the left intermediate portion 34b of the left side wall 34A, an upper end of the left lower portion 34c of the left side wall 34A, a lower end of a left side (the left side wall 34A side) of the rear intermediate portion 35b of the rear side wall 35A (a lower end of a portion that is not continuously connected to the rear lower portion 35c), and a lower end of a left side of the front intermediate portion 36b of the front side wall 36A (a lower end of a portion that is not continuously connected to the front lower portion 36c).

The second bottom intermediate portion 33c is positioned below the first bottom intermediate portion 33b. The second bottom intermediate portion 33c is connected to the following end portions: a lower end of the right intermediate portion 32b of the right side wall 32A, an upper end of the right lower portion 32c of the right side wall 32A, a lower end of a right side (the right side wall 32A side) of the rear intermediate portion 35b of the rear side wall 35A (a lower end of a portion that is not continuously connected to the rear lower portion 35c), and a lower end of a right side of the front intermediate portion 36b of the front side wall 36A (a lower end of a portion that is not continuously connected to the front lower portion 36c).

The bottom lower portion 33d is positioned below the second bottom intermediate portion 33c. The bottom lower portion 33d is connected to the following lower ends: a lower end of the right lower portion 32c of the right side wall 32A, a lower end of the left lower portion 34c of the left side wall 34A, a lower end of the rear lower portion 35c of the rear side wall 35A, and a lower end of the front lower portion 36c of the front side wall 36A.

As shown in FIG. 6, FIG. 8, and FIG. 9, the flange portion 39 is disposed on a standing end portion (an upper end portion) of the side wall 37. The flange portion 39 is extended outward from the upper end portion of the side wall 37 (in a direction separating from the inner space of the chassis 3).

In particular, the flange portion 39 is disposed extending outward from each of the upper end portions of the front side wall 36A, the rear side wall 35A, the left side wall 34A, and the right side wall 32A (extending rightward from the right side wall 32A, leftward from the left side wall 34A, backward from the rear side wall 35A, and forward from the front side wall 36A).

As shown in FIG. 8 and the like, a plurality of through holes 39a and 39b are formed on the flange portion 39.

A configuration of the lid 3B will be explained next.

As shown in FIG. 1, FIG. 6, and the like, the lid 3B includes a side wall 40, an upper wall 41, and a flange portion 42.

The side wall 40 is disposed extending downward from an outer edge of the upper wall 41, and is constituted to have a shape of substantially-rectangular frame in a top view. The side wall 40 has four side walls (a front side wall 36B, a rear side wall 35B, a left side wall 34B, and a right side wall 32B) respectively constituting a front side wall, a rear side wall, a left side wall, and a right side wall of the lid 3B.

The right side wall 32B is arranged on a right portion of the lid 3B. An inner surface of the right side wall 32B is oriented to face leftward, and an outer surface of the right side wall 32B is oriented to face rightward. The left side wall 34B is arranged on a left portion of the lid 3B. An inner surface of the left side wall 34B is oriented to face rightward, and an outer surface of the left side wall 34B is oriented to face leftward. The rear side wall 35B is arranged on a rear portion of the lid 3B. An inner surface of the rear side wall 35B is oriented to face forward, and an outer surface of the rear side wall 35B is oriented to face backward. The front side wall 36B is arranged on a front portion of the lid 3B. An inner surface of the front side wall 36B is oriented to face backward, and an outer surface of the front side wall 36B is oriented to face forward.

As shown in FIG. 2, the right side wall 32B of the lid 3B is positioned above the right side wall 32A of the main body 3A. As shown in FIG. 2, the left side wall 34B of the lid 3B is positioned above the left side wall 34A of the main body 3A. As shown in FIG. 3, the rear side wall 35B of the lid 3B is positioned above the rear side wall 35A of the main body 3A. As shown in FIG. 3, the front side wall 36B of the lid 3B is positioned above the front side wall 36A of the main body 3A.

As shown in FIG. 1, FIG. 3, and FIG. 6, the upper wall 41 includes a first upper wall 41a and a second upper wall 41b. The first upper wall 41a and the second upper wall 41b each have a substantially-rectangular shape, and are continuously connected by one side (a long side) of the rectangular shape.

The first upper wall 41a is positioned on a side of the rear side wall 35B (on the rear side). The second upper wall 41b is positioned on a side of the front side wall 36B (on the front side). The first upper wall 41a is inclined (separating from the main body 3A) shifting upward gradually from the side of the rear side wall 35B (the rear side) toward the side of the front side wall 36B (the front side).

The second upper wall 41b is inclined (separating from the main body 3A) shifting upward gradually from the side of the front side wall 36B (the front side) toward the side of the rear side wall 35B (the rear side). An upper end (a front end) of the inclining of the first upper wall 41a is connected to an upper end (a rear end) of the inclining of the second upper wall 41b. A connecting portion between the first upper wall 41a and the second upper wall 41b is positioned on the highest portion of the lid 3B. The connecting portion is positioned to be closer to the side of the front side wall 36A (the front side) than to a center position between the front side wall 36B and the rear side wall 35B.

In other words, the connecting portion is positioned to be closer to the front side than to a center of the chassis 3 in the front to rear direction C. In addition, an inner angle of the connecting portion (an angle on a side of the main body 3A) is set to be an obtuse angle (for example, a range from 120 degrees to 150 degrees).

A lower end (a rear end) of the inclining of the first upper wall 41a is connected to an upper end of the side wall 40 positioned on a side of the rear side wall 35B (on the rear side). A rear side of a left end of the first upper wall 41a is connected to a rear side of the upper end of the side wall 40 positioned on the left side (on a side of the left side wall 34B). A front side of the left end of the first upper wall 41a is connected to a front side of the upper end of the side wall 40 positioned on the left side (on the side of the left side wall 34B) by a first inclining wall 43. A right end of the first upper wall 41a is connected to an upper end of the side wall 40 positioned on the right side (on a side of the right side wall 32B) by a second inclining wall 44.

A lower end (a rear end) of the inclining of the second upper wall 41b is connected to an upper end of the side wall 40 positioned on a front side (on a side of the front side wall 36B). A front side of a left end of the second upper wall 41b is connected to a front side of the upper end of the side wall 40 positioned on the left side (on a side of the left side wall 34B). A rear side of the left end of the second upper wall 41b is connected to a rear side of the upper end of the side wall 40 positioned on the left side (on the side of the left side wall 34B) by the first inclining wall 43. A right end of the second upper wall 41b is connected to an upper end of the side wall 40 positioned on the right side (on a side of the right side wall 32B) by a second inclining wall 44.

The first inclining wall 43 is extended inclining rightward (diagonally right-upward) from the front side of the upper end of the side wall 40 positioned on the left side (the side of the left side wall 34B). The first inclining wall 43 is formed to have a substantially-rectangular shape. A lower side of the first inclining wall 43 having the rectangular shape is connected to the front side of the upper end of the side wall 40 positioned on the left side (on the side of the left side wall 34B). One of two upper sides of the first inclining wall 43 is connected to a left end of the first upper wall 41a. The other one of two upper sides of the first inclining wall 43 is connected to a left end of the second upper wall 41b.

The second inclining wall 44 is extended inclining leftward (diagonally left-upward) from the upper end of the side wall 40 positioned on the right side (the side of the right side wall 32B). The second inclining wall 44 is formed to have a substantially-rectangular shape. A lower side of the second inclining wall 44 having the rectangular shape is connected to the upper end of the side wall 40 positioned on the right side (on the side of the right side wall 32B). One of two upper sides of the second inclining wall 44 is connected to a right end of the first upper wall 41a. The other one of two upper sides of the second inclining wall 44 is connected to a right end of the second upper wall 41b.

An outer surface (an upper surface) of the upper wall 41 (the first upper wall 41a and the second upper wall 41b) can be provided with heat-radiation fins (not shown in the drawings). The heat-radiation fins can be arranged in parallel on a substantially-whole surface of the outer surface of the upper wall 41 with intervals in the front to rear direction C and in the right to left direction F. The provision of the heat-radiation fins expands a heat-radiation area (an surface area) of the chassis 2, and thereby suppressing the heat rising of the chassis 2.

The flange portion 42 is disposed on a lower end portion of the side wall 40. The flange portion 42 is disposed extending outward (extending rightward from the right side wall 32B, leftward from the left side wall 34B, backward from the rear side wall 35B, and forward from the front side wall 36B) from the lower end portion of the side wall 40. In particular, the flange portion 42 is disposed extending outward from each of the lower end portions of the four side walls (the front side wall 36B, the rear side wall 35B, the left side wall 34B, and the right side wall 32B).

A plurality of through holes 42a and 42b are formed on the flange portion 42. The flange portion 42 is fixed to the flange portion 39 of the main body 3A by a fastening tool (a bolt and a nut). In particular, the through hole 42a is overlapped with the through hole 39a, and the bolt is inserted into the through hole 42a and the through hole 39a. The nut is screwed with the bolt, and thereby the flange portion 42 of the lid 3B is fixed to the flange portion 39 of the main body 3A.

In this manner, the lid 3B is detachably fixed to the main body 3A. The through hole 42b is used in mounting the power source apparatus 1 on the working machine 100 described later.

An inner surface of the upper wall 41 of the lid 3B constitutes the first wall surface 31 of the chassis 3. An inner surface of the right side wall 32A of the main body 3A and an inner surface of the right side wall 32B of the lid 3B constitute the second wall surface 32 of the chassis 3. An inner surface of the bottom wall 38 of the main body 3A constitutes the third wall surface 33 of the chassis 3.

An inner surface of the left side wall 34A of the main body 3A and an inner surface of the left side wall 34B of the lid 3B constitute the fourth wall surface 34 of the chassis 3. An inner surface of the rear side wall 35A of the main body 3A and an inner surface of the rear side wall 35B of the lid 3B constitute the fifth wall surface 35 of the chassis 3. An inner surface of the front side wall 36A of the main body 3A and an inner surface of the front side wall 36B of the lid 3B constitute the sixth wall surface 36 of the chassis 3.

Meanwhile, the first wall surface 31, the second wall surface 32, and the fourth wall surface 34 to the sixth wall surface 36 constituting the inner wall surface of the chassis 3 are not illustrated in FIG. 1. However, in order to help understanding the shape of the chassis 3, the reference numerals 31 to 36 are added to the outer wall surfaces respectively corresponding to the second wall surface 32, and the fourth wall surface 34 to the sixth wall surface 36 in FIG. 1.

<Housing>

As shown in FIG. 2, FIG. 3, and the like, the housing 4 constitutes a housing chamber 13 that is configured to house the batteries 2. In the present embodiment, the housing 4 constitutes the housing chamber 13 that is configured to house and arrange the plurality of battery modules 7 in parallel. As shown in FIG. 6 and the like, the housing 4 is constituted of a cover 14 and a bracket 15.

The cover 14 is arranged on a side of the first wall surface 31 of the battery module 7 (the upper side). In the present embodiment, the cover 14 is arranged above the upper surfaces of the plurality of battery modules 7 (the module assembly 20) over the entire area of the upper surfaces (in order to cover the entire area). The cover 14 is constituted of a plate having a substantially-rectangular shape in a top view, and has concave portions being concave in the upper to lower direction and convex portions being convex in the upper to lower direction.

In particular, the cover 14 has an outer convex portion 14a (a first convex portion 14a), an inner convex portion 14b (a second convex portion 14b), and a concave portion 14c as shown in FIG. 3 and FIG. 6. The outer convex portion 14a is disposed on one side (the front side) of the battery modules 7 in the second parallel direction (the front- to rear direction C), and another outer convex portion 14a is disposed on the other side (the rear side). The outer convex portion 14a is positioned above the flange portion 39 of the main body 3A of the chassis 3. The inner convex portion 14b is disposed on an intermediate position between two outer convex portions 14a and separates from the outer convex portion 14a. The inner convex portion 14b is positioned above the battery modules 7 on a center of the batter modules 7 in the second parallel direction (the front- to rear direction C).

The concave portion 14c is disposed between the outer convex portion 14a and the inner convex portion 14b, and connects the outer convex portion 14a and the inner convex portion 14b to each other. The concave portion 14c is concave (downward) toward the battery module 7 side with respect to the first convex portion 14a and the second convex portion 14b. A plurality of opening portions 17 are formed on the concave portion 14c. The opening portions 17 are positioned above the bus bar 9 of the battery module 7, and thus the bus bar 9 exposes from the opening portions 17 under the state where the battery module 7 is housed in the housing 4.

A part of the opening portions of the plurality of opening portions 17 are enlarged opening portions 17A formed to be larger than the remaining opening portions. The present embodiment employs a plurality of the enlarged opening portions 17A. In particular, two of sixteen opening portions 17 are formed as the enlarged opening portions 17A.

As shown in FIG. 2, the enlarged opening portion 17A opens to face the first inter-module path 12A. In this manner, the enlarged opening portion 17A serves as an intake portion (hereinafter referred to as "a first intake portion 17A") used for taking the air into the first inter-module path 12A. The housing 4 is provided with a plurality of the intake portions (the first intake portions 17A) disposed on the upper side of the housing chamber 13. That is, the first intake portion 17A is disposed on the housing 4 on the side of the first wall surface 31, the housing 4 constituting the housing chamber 13.

In other words, the first wall surface 31 is opposed to the first intake portion 17A of the housing 4. In this manner, the air flowing in the housing 4 on the side of the first wall surface 31 (in an air introduction path (an air introduction path) 50 described later) in the inner space of the chassis 3 is taken from the first intake portion 17A into the housing chamber 13.

The first intake portion 17A is formed to have a rectangular shape, and has a width in the front to rear direction C larger than a width in the right to left direction F. The width of the first intake portion 17A in the right to left direction F is smaller than a width of the battery module 7 in the right to left direction F. In this manner, the first intake portion 17A does not face both of the first inter-module path 12A and the second inter-module path 12B that are arranged in the right to left direction F (in the first parallel arrangement direction). Thus, the air taken from the first intake portion 17A is prevented from flowing into the second inter-module path 12B without passing through the inter-cell path 11.

In addition, the width of the first intake portion 17A in the right to left direction F is larger than a width of the first inter-module path 12A in the right to left direction F. In this manner, the air taken from the first intake portion 17A can be made flow efficiently and certainly in the first inter-module path 12A.

Among the plurality of opening portions 17, the opening portions 17B other than the enlarged opening portions (the first intake portions) 17A do not face the first inter-module path 12A, and thus do not serve as the intake portions for taking the air into the first inter-module path 12A. Thus, the air is taken substantially only from the first intake portion 17A, and thereby the air is taken from the side of the first wall surface 31 (the upper side) into the housing chamber 13. That is, the air is not taken from the opening portions 17B other than the first intake portion 17A into the housing chamber 13 or taken a little into the housing chamber 13 if the air is taken from the opening portions 17B other than the first intake portion 17A, and thus the function and effect of the present invention is not deteriorated.

Meanwhile, the present embodiment employs one first inter-module path 12A, and thus the present embodiment employs one first intake portion 17A. However, when the embodiment employs a plurality of the first inter-module paths 12A arranged in the right to left direction F, the embodiment employs a plurality of the first intake portions 17A arranged in the right to left direction F. In the case of that configuration, the air is taken from the plurality of first intake portions 17A into the housing chamber 13, the first intake portions 17A being arranged in the right to left direction F.

The concave portion 14c has a second fixing portion 19 that is configured to be fixed to a first fixing portion 18 of a bracket 15. The bracket 15 will be described below. The second fixing portion 19 forms through holes that are provided for insertion of the bolts. The second fixing portion 19 is disposed on each of corner portions (four corners) between both end portions in the first parallel arrangement direction and both end portions in the second parallel arrangement direction.

As shown in FIG. 6, the bracket 15 has a bottom plate 15a, a side plate 15b, and an extending portion 15c.

The bottom plate 15a is arranged on one side of the battery modules 7 (below the battery modules 7). To be detailed, the bottom plate 15a is disposed below the lower surfaces of the plurality of battery modules 7 (the module assembly 20), and thereby entirely covers the lower surfaces. The bottom plate 15a is a plate on which the battery modules 7 are arranged (mounted), and also is a partition plate for separating the housing chamber 13 and an intake chamber 70 from each other, the intake chamber 70 being described below. The bottom plate (the partition plate) 15a is formed to have a substantially-rectangular shape in a top view, and is arranged orienting one side (a short side) of the rectangular shape in the front to rear direction C and orienting the other side (a long side) of the rectangular shape in the right to left direction F.

The bottom plate (the partition plate) 15a is formed to have a substantially-rectangular shape in a top view, and is formed to have a width in the right to left direction F larger than a width in the front to rear direction C. A sending portion 16 is formed on the bottom plate (the partition plate) 15a, the sending portion 16 being configured to send the air staying in the housing chamber 13 to the outside of the housing chamber 13. The sending portion 16 is communicated with the second inter-module path 12B. The number of the sending portions 16 is not limited. However, the sending portions 16 are provided in accordance with the number of the second inter-module paths 12B in the first parallel arrangement direction (the right to left direction F). In the present embodiment, two sending portions 16 are formed and arranged at an interval in the first parallel arrangement direction (the right to left direction F) of the battery modules 7.

Two sending portions 16 are opened to respectively face two second inter-module paths 12B. In this manner, the air in the housing chamber 13 is sent out from two sending portions 16 through the second inter-module paths 12B. For convenience of the explanation, regarding the two sending portions 16 (that is, two opening portions), the opening portion positioned on the left side (on the side of the fourth wall surface 34) is referred to as a first sending portion 161 below, and the opening portion positioned on the right side (on the side of the fourth wall surface 34) is referred to as a second sending portion 162 below.

The sending portions 16 (the first sending portion 161 and the second sending portion 162) each have a substantially-rectangular shape, and are each formed to have a width in the front to rear direction C larger than a width in the right to left direction F. The width of the sending portion 16 in the right to left direction F is smaller than the width of the battery module 7 in the right to left direction F (in the first parallel arrangement direction). In this manner, one sending portion 16 does not face both of the first inter-module path 12A and the second inter-module path 12B that are arranged in the right to left direction F (in the first parallel arrangement direction).

Thus, the air taken into the first inter-module path 12A is prevented from being sent from the sending portion 16 without passing through the inter-cell path 11. In addition, one sending portion 16 faces the plurality of the second inter-module paths 12B (two second inter-module paths 12B in the present embodiment) arranged in the front to rear direction C (in the second parallel arrangement direction). In this manner, the sending portion 16 (one sending portion 16) is capable of collectively sending out the air that is introduced into the plurality of second inter-module paths 12B.

The side plate 15*b* includes a first side plate 151*b* and a second side plate 152*b*. The first side plate 151*b* stands up from one of edge portions (a front edge portion) of the bottom plate (the partition plate) 15*a*. The second side plate 152*b* stands up from the other one of the edge portions (a rear edge portion) of the bottom plate 15*a*, the other one of the edge portions being opposed to the one of the edge portions.

The extending portion 15*c* is disposed on a standing end portion (the upper end portion) of the side plate 15*b* (the first side plate 151*b* and the second side plate 152*b*), and extends in a direction separating from each other (extends forward and backward). In particular, the extending portion 15*c* extends forward from the upper end portion of the first side plate 151*b* and extends backward from the upper end portion of the second side plate 152*b*. The extending portion 15*c* is positioned above the flange portion 39 of the main body 3A of the chassis 3, and has a fastening portion 21 configured to be fastened to the flange portion 39.

The fastening portion 21 forms a through hole that is provided for insertion of the bolt. The fastening portion 21 is fastened to the flange portion 39 of the main body 3A of the chassis 3 by a fastening tool (a bolt and a nut). In particular, the through hole formed on the fastening portion 21 is overlapped with the through hole 39*b* formed on the flange portion 39 of the main body 3A of the chassis 3, and the bolt 24 is inserted into the through hole and the through hole 39*b*. And then, the nut is screwed with the bolt 24.

In this manner, as shown in FIG. 3, FIG. 4, and FIG. 7, the bracket 15 is detachably fixed to the main body 3A of the chassis 3.

The bracket 15 has a first fixing portion that stands up from the bottom plate 15*a*. The first fixing portion 18 extends upward from the vicinity of each of four corner portions of the bottom plate 15*a*. The first fixing portion 18 forms a through hole that is provided for insertion of the bolt. The first fixing portion 18 and the second fixing portion 19 are fastened by a fastening tool (a bolt and a nut) and thereby are fixed to each other.

Figure 10:
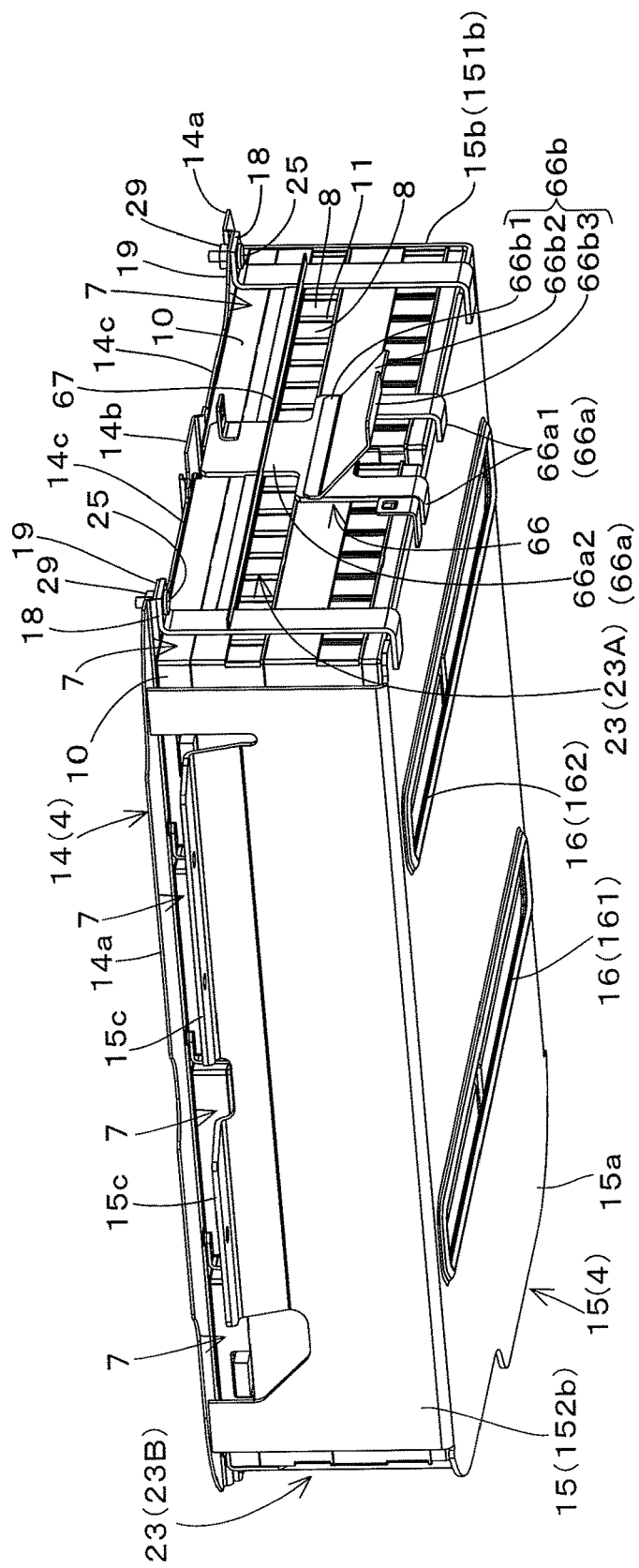
FIG. 10 is a perspective view illustrating the housing and batteries (a module assembly) each seen upwardly from the right rear according to the embodiment.

In particular, the through hole formed on the first fixing portion 18 is overlapped with the through hole 39*b* formed on the second fixing portion 19, the bolt 25 is inserted into the overlapped through holes, then the nut 29 is screwed with the bolt 25, and thereby the first fixing portion 18 and the second fixing portion 19 are fixed to each other (refer to FIG. 2, FIG. 5, and FIG. 10). In this manner, the cover 14 is detachably fixed to the bracket 15.

The plurality of batteries 2 (the plurality of battery modules 7) are arranged between the cover 14 and the bottom plate 15*a* of the bracket 15. The first fixing portion 18 and the second fixing portion 19 are fixed to each other, and thereby the plurality of battery modules 7 (the module assembly 20) are sandwiched and supported between the cover 14 and the bottom plate 15*a* of the bracket 15.

The fastening portion 21 of the bracket 15 is fastened to the flange portion 39 of the main body 3A of the chassis 3 under the state where the plurality of batteries 2 (the battery modules 7) are supported in the housing 4 (the cover 14 and the bracket 15), and thereby the plurality of batteries 2 (the battery module 7) are arranged in the inner space of the chassis 3 together with the housing 4.

That is, the housing 4 is fixed to the chassis 3 under the state where the plurality of batteries 2 (the battery modules 7) are preliminarily housed in the housing 4 (under the sub-assembly state). Thus, the plurality of batteries 2 (the battery modules 7) are easily assembled to the chassis 3, and thereby the operability of assembly of the power source apparatus 1 is improved.

<Blower>

As shown in FIG. 2, FIG. 3, FIG. 6, and the like, the blower 5 is arranged on one side of (that is, below) the batteries 2 (the battery modules 7). In particular, the blower 5 is arranged between the battery modules 7 and the third wall surface 33 of the chassis 3. The blower 5 has a blowing portion 5*a* and an intake portion 5*b*. The blowing portion 5*a* is configured to blow the air in accordance with revolutions of the fan. The intake portion 5*b* is configured to take the air toward the fan. The fan of the blower 5 is constituted of a centrifugal fan (a sirocco fan) that is configured to be driven to revolve by an electric motor.

The blowing portion 5*a* is arranged on one side of (that is, below) the battery modules 7, and is oriented (backward) to the second wall surface 32. The intake portion 5*b* is arranged on one side of (that is, below) the battery modules 7, and is oriented (downward) to the third wall surface 33. The blower 5 is configured to be driven with use of an electric power accumulated in the batteries 2.

As shown in FIG. 4, the blowing portion 5*a* is disposed on a position closer to the fifth wall surface 35 (the rear side) than to a center position between the fifth wall surface 35 and the sixth wall surface 36 (a center position of the chassis 3 in the front to rear direction). Additionally, in the second parallel arrangement direction (the front to rear direction) of the plurality of battery modules 7, the blowing portion 5*a* is disposed on the position closer to one side (the rear side) separating in the direction from the center of the battery modules 7 in the direction.

Figure 11:
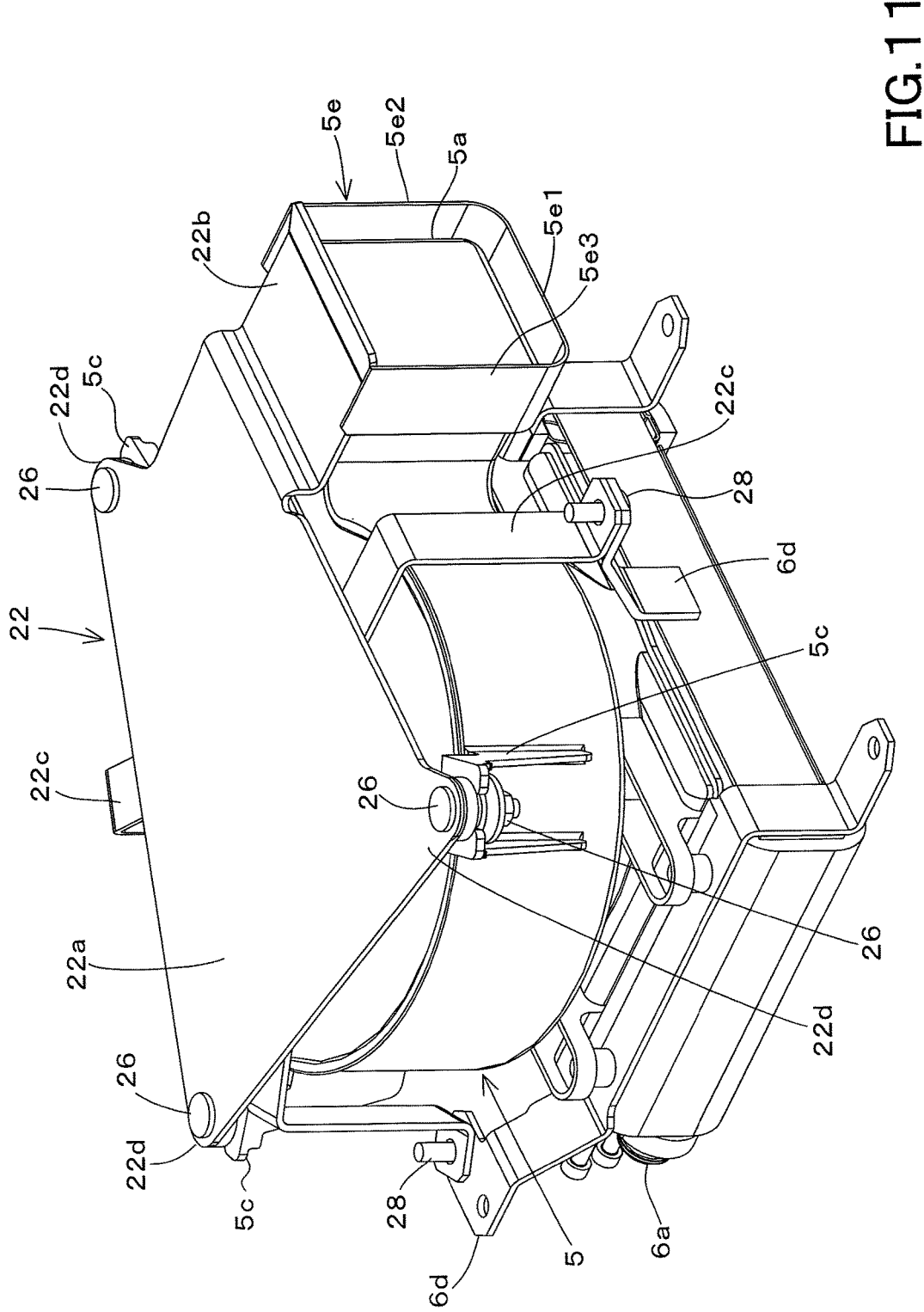
FIG. 11 is a perspective view illustrating a supporting body, the blower, and the heat exchanger each seen downwardly from the right rear according to the embodiment.

As shown in FIG. 6, a supporting body 22 is arranged on one side of (that is, below) the batteries 2 (the battery modules 7). The supporting body 22 is configured to support the blower 5. The blower 5 is supported in the inner space of the chassis 3 by the supporting body 22. As shown in FIG. 11, the supporting body 22 has a supporting plate 22*a*, an extending plate 22*b*, and a stay 22*c*.

The supporting plate 22a has a plurality of fixing portions 22d that are configured to fix the blower 5. The supporting plate 22a is formed to have a substantially-rectangular shape in a top view. The fixing portion 22d is disposed in the vicinity of each of three corner portions. A plurality of brackets 5c (three brackets 5c) are attached on a circumference of the blower 5. The bracket 5c of the blower 5 is fixed to the fixing portion 22d by a fixing tool (a bolt and a nut) 26. In this manner, the blower 5 is fixed and supported below the supporting plate 22a.

An air introduction tube 5e is attached to the blowing portion 5a of the blower 5. The air introduction tube 5e is a tube configured to introduce the air in a predetermined direction, the air having been blown from the blowing portion 5a. The air introduction tube 5e has a lower plate 5e1, a front plate 5e2, and a rear plate 5e3. The lower plate 5e1, the front plate 5e2, and the rear plate 5e3 are formed to be integrated. An upper plate of the air introduction tube 5e is constituted of an extending plate 22b described later.

As shown in FIG. 2 and FIG. 8, the air introduction tube 5e extends toward the side of the second wall surface 32 under the state where the blower 5 is stored in the inner space of the chassis 3.

As shown in FIG. 11, the extending plate 22b extends protruding outward from an outer edge of the supporting plate 22a. The extending plate 22b constitutes the upper plate of the air introduction tube 5e. That is, the air introduction tube 5e having a square tube shape is constituted of the extending plate 22b, the lower plate 5e1, the front plate 5e2, and the rear plate 5e3. As shown in FIG. 2, the extending plate 22b extends toward the side of the second wall surface 32 under the state where the blower 5 is stored in the inner space of the chassis 3.

The stay 22c extends downward from a clearance between the fixing portions 22d of the supporting plate 22a, the fixing portions 22d being adjacent to each other. In the present embodiment, three stays 22c pass through the outside of the blower 5 and respectively extend downward from the clearances between three fixing portions 22d. A lower end of the stay 22c is fixed to a bracket 6d by a fixing tool 28, the bracket 6d being attached to the heat exchanger 6. In this manner, the heat exchanger 6 is fixed to the supporting body 22 under the state where the heat exchanger 6 is arranged below the blower 5.

As shown in FIG. 2, at least a part of the sending portions 16 of the housing 4 are arranged being shifted in a perpendicular direction (the left to right direction F) that is perpendicular to an arrangement direction (the upper to lower direction I) where the blower 5 and the battery modules 7 are arranged such that the part of the sending portions 16 are not overlapped with the blower 5 in the arrangement direction. In particular, at least a part of the blower 5 (or a whole of the blower 5) is arranged between the first sending portion 161 and the second sending portion 162 in the perpendicular direction (the right to left direction F).

In this manner, the air sent from the sending portion 16 is suppressed from blowing the blower 5, and thus the blower 5 is prevented from being warned by the warm air sent from the sending portion 16. Thus, that configuration prevents a temperature of the air blown from the blower 5 from being increased, and thereby improving a cooling effect to the battery modules 7.

<Heat Exchanger>

The heat exchanger 6 is an device configured to cool the air flowing in the inner space of the chassis 3 in the heat exchanging method, and employs an evaporator in the present embodiment. The heat exchanger 6 has a plurality of tubes and fins for heat radiation. The plurality of tubes are configured to flow a coolant inside the tubes. The fins are disposed so as to conduct the heat to the tubes. The heat is exchanged between the coolant flowing in the tubes of the heat exchanger 6 and the air passing around the tubes and the fins, and thereby the air passing through the heat exchanger 6 is cooled. As shown in FIG. 6, an entrance 6a and an exit 6b of the coolant of the heat exchanger 6 protrude outside the chassis 3 from a left lower portion 34c of the fourth side wall 34A of the chassis 3.

As shown in FIG. 2 and FIG. 3, the heat exchanger 6 is arranged on one side of (that is, below) the batteries 2 (the battery modules 7). To be detailed, the heat exchanger 6 is arranged between the battery modules 7 and the third wall surface 33 of the chassis 3. To be detailed more, the heat exchanger 6 is arranged between the third wall surface 33 and the blower 5. The heat exchanger 6 has an intake portion 6c on the side of the third wall surface 33, the intake portion 6c being configured to take the air having passed through the battery modules 7.

When the fans are driven by the blower 5, the air is taken from the intake portion 6c of the heat exchanger 6, and passes through the heat exchanger 6, thereby being cooled. The cooled air is sent to the side opposed to the intake portion 6c (to the side of the blower 5), and is taken (sucked) into the intake portion 5b of the blower 5. In this manner, the blower 5 is capable of blowing the air from the blowing portion 5a, the air of low temperature having been cooled by the heat exchanger 6.

<Air Introduction Path>

The air introduction path 50 is a path configured to introduce the air into a space constituted between the plurality of batteries 2. In the present embodiment, the air introduction path 50 is a path configured to introduce he air into a space (the inter-module path) constituted between the plurality of battery modules 7.

As shown in FIG. 2 to FIG. 5, the air introduction path 50 is formed between the batteries 2 (the battery modules 7) and the first wall surface 31 of the chassis 3, the air introduction path 50 being configured to introduce the air into the battery module 7. In the present embodiment, the air introduction path 50 is constituted of the first wall surface 31 and the upper surfaces 7a of the battery modules 7 (in more particular, the upper surfaces of the covers), the upper surfaces 7a being opposed to the first wall surface 31.

That is, the wall surface (the first wall surface 31) of the chassis 3 constitutes a part of the air introduction path 50. In other words, the air introduction path 50 is formed without including a duct separated from the chassis 3. The air introduction path 50 is disposed above the upper surfaces of the plurality of battery modules 7 (the module assembly 20) over the entire area of the upper surfaces.

As shown in FIG. 3, the air introduction path 50 has a first area 51 and a second area 52. The first area 51 and the second area 52 are disposed to be arranged in the second parallel arrangement direction (the front-to rear direction) of the battery modules 7. The first area 51 is positioned closer to the side of the vertical wall surface (the first vertical wall surface) 36 than a center 5f of the blowing portion 5a of the blower 5 (that is, positioned on the side of the sixth wall surface 36 (on the front side)).

The second area 52 is positioned closer to the side of the second wall surface 35 than the center 5f of the blowing portion 5a, the second wall surface 35 being opposed to the first vertical wall surface 36 (that is, positioned on the side of the fifth wall surface 35 (on the rear side)). In FIG. 3, a boundary line between the first area 51 and the second area 52 is indicated by a chain line L.

The inner space of the chassis 3 includes the first area 51 and the second area 52 between the first lateral wall surface (the first wall surface) 31 and the batteries 2 (the battery modules 7), the first area 51 being positioned closer to the side of the vertical wall surface (the first vertical wall surface) 36 than the center 5f of the blowing portion 5a (that is, positioned on the side of the sixth wall surface 36), the second area 52 being positioned closer to the side opposed to the vertical wall surface (the first vertical wall surface) 36 than the center 5f of the blowing portion 5a (that is, positioned on the side of the fifth wall surface 35).

As shown in FIG. 3, the air introduction path 50 has an expanded portion (referred to as a first expanded portion 53) expanding a separation distance d between the first wall surface 31 and the batteries 2 (the battery modules 7) from the second area 52 toward the first area 51. In addition, the air introduction path 50 has an expanded portion (referred to as a second expanded portion 54) expanding the separation distance d from the first area 51 toward the second area 52.

The first expanded portion 53 is disposed above and over the second area 52 and a part of (a rear portion of) the first area 51. The second expanded portion 54 is disposed above a part of (a front portion of) the first area 51. That is, the first area 51 has the second expanded portion 54 above the front portion of the first area 51, and has the first expanded portion 53 above the rear portion of the first area 51.

The first expanded portion 53 and the second expanded portion 54 are connected at a portion 55 at which the separation distance d is expanded to the maximum. In this manner, a shape of the air introduction path 50 in the front to rear direction C is formed to have a substantially-rectangular shape that has the separation distance d is maximized at an intermediate portion (the portion 55) in the front to rear direction C. The portion 55 at which the separation distance d is maximized is positioned on the first area 51. The blowing portion 5a of the blower 5 is disposed on a position closer to the fifth wall surface 35 (the rear side) than to the portion 55 at which the separation distance d between the first wall surface 31 and the battery modules 7 is maximized.

In this manner, when the air blown from the blowing portion 5a flows upward and is introduced into the air introduction path 50 by a flow path 60 described below, the air introduced in the air introduction path 50 is introduced by the first expanded portion 53 toward a direction of expanding the separation distance d between the batteries 2 (the battery modules 7) and the first wall surface 31.

In this manner, the air is introduced by the first expanded portion 53 to the side of the sixth wall surface 36 opposed to the fifth wall surface 35, the air being blown from the blowing portion 5a arranged on the side of the fifth wall surface 35, and thereby the flow of the air is homogenized from the blowing portion 5a to the air introduction path 50. In this manner, the batteries 2 are cooled preferably in a good balance.

On the side backward from the center 5f of the blowing portion 5a (on the side of the sixth wall surface 36), the first expanded portion 53 gradually increases the separation distance d in accordance with the separation from the center 5f. In addition, on the side forward from the center 5f of the blowing portion 5a (on the side of the fifth wall surface 35), the first expanded portion 53 gradually decreases the separation distance d in accordance with the separation from the center 5f.

Figure 12:
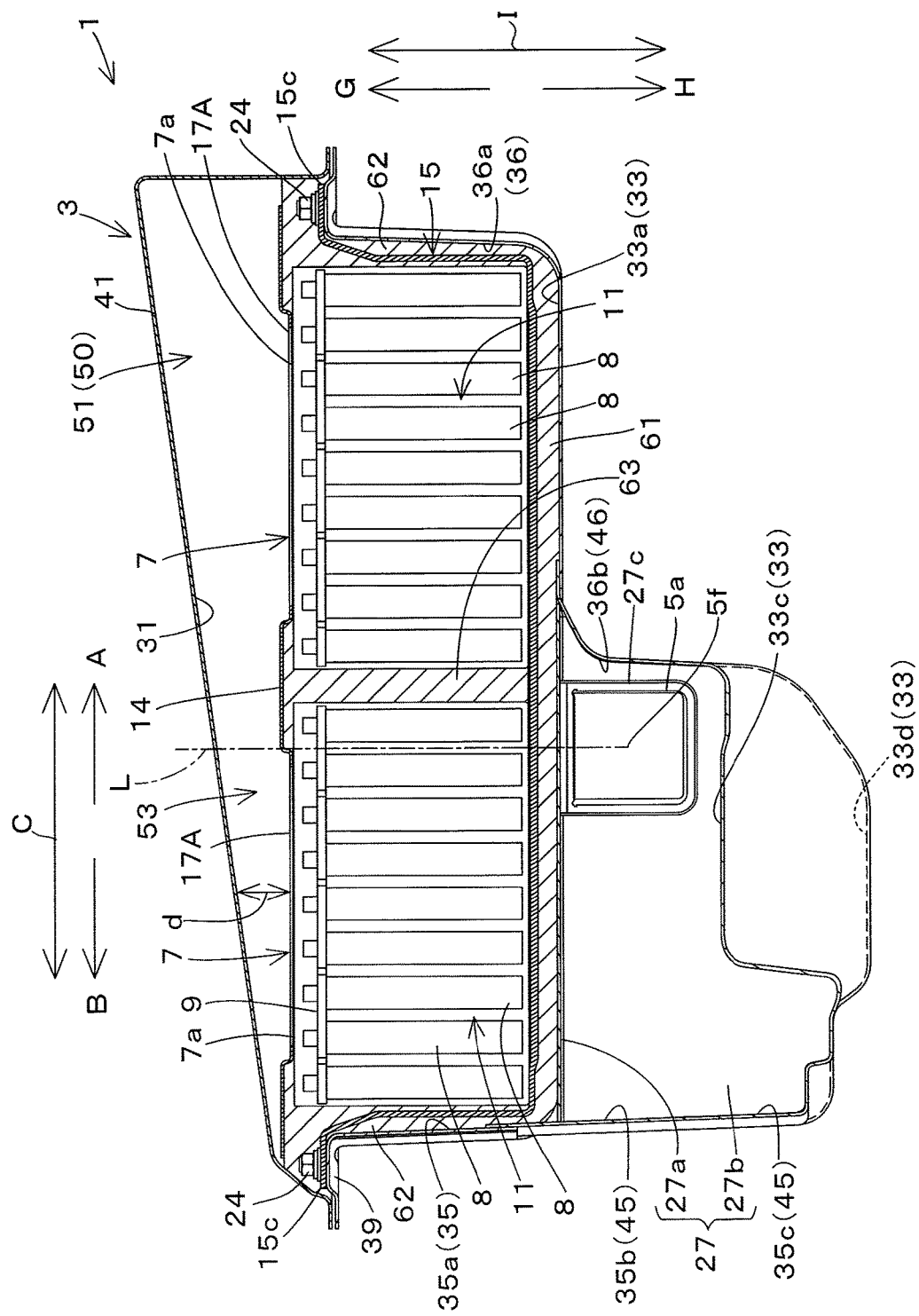
FIG. 12 is a view illustrating a first modified example of the power source apparatus according to the embodiment of the present invention.
Figure 13:
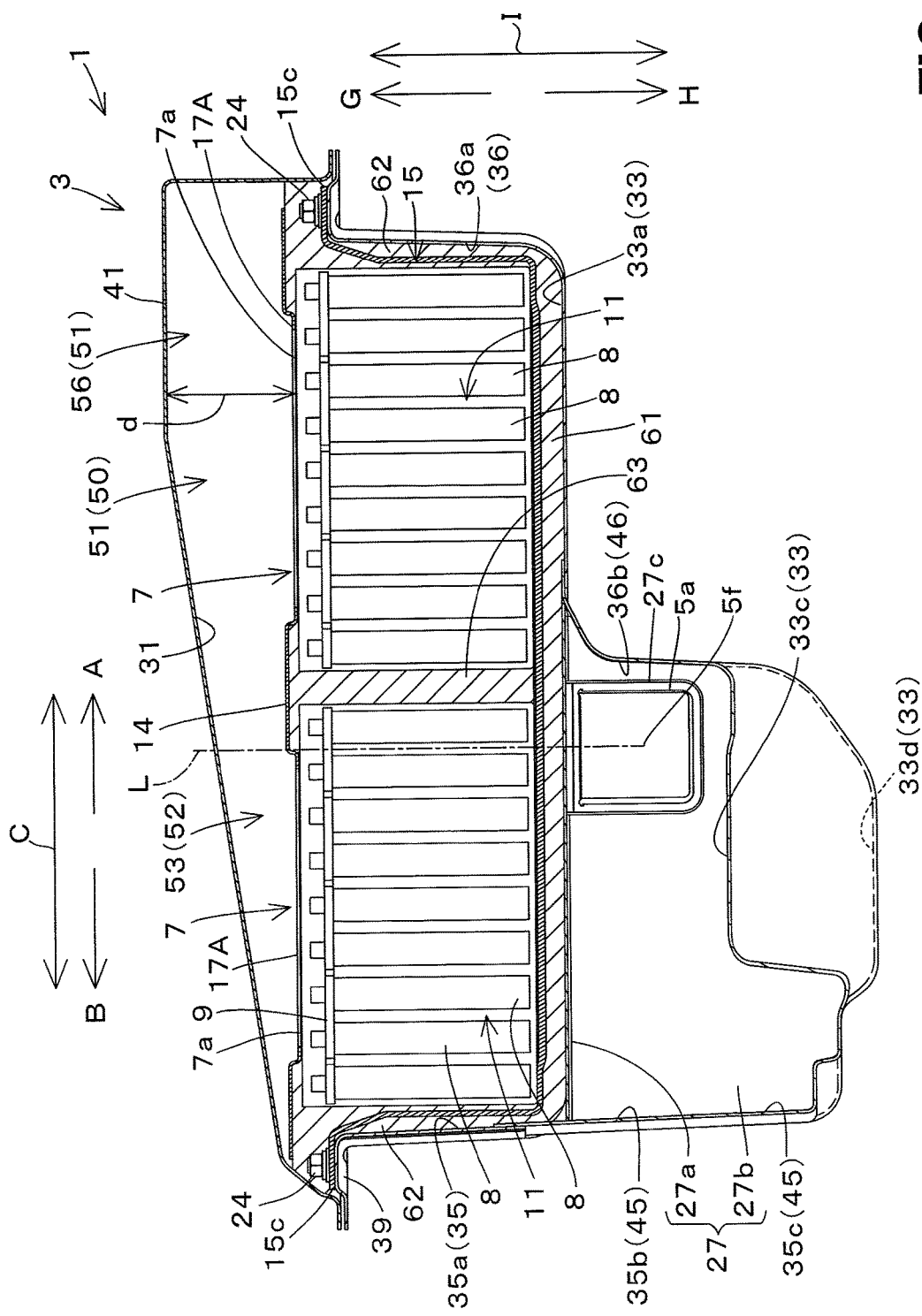
FIG. 13 is a view illustrating a second modified example of the power source apparatus according to the embodiment.

Meanwhile, the shape of the air introduction path 50 in the front to rear direction C is not limited to the shape shown in FIG. 3, and for example may be changed to the shapes shown in FIG. 12 and FIG. 13. And, FIG. 12 and FIG. 13 show the cross-sectional views illustrating a position identical to that of FIG. 3. Configurations corresponding to the configurations shown in FIG. 3 are given the same reference numerals.

As in the embodiment described above (refer to FIG. 3), in a modified example (a first modified example) shown in FIG. 12 and in a modified example (a second modified example) shown in FIG. 13, the blowing portion 5a of the blower 5 is arranged closer to the side of the fifth wall surface 35 (the rear side) than the position at which the separation distance d between the first wall surface 31 and the battery modules 7 is maximized.

In addition, the air introduction path 50 has the expanded portion expanding the separation distance d between the first wall surface 31 and the batteries 2 from the second area 52 toward the first area 51. However, the air introduction path 50 in the first modified example and in the second modified example has the first expanded portion 53 but does not have the second expanded portion 54.

In particular, in the first modified example shown in FIG. 12, the first expanded portion 53 is disposed over the entire area of the air introduction path 50 (the entire area of the first area 51 and the entire area of the second area 52). In other words, the air introduction path 50 gradually expands the air introduction path 50 from a rear end portion of the air introduction path 50 toward the front end portion.

In the second modified example shown in FIG. 13, the first expanded portion 53 is disposed from the rear end portion of the air introduction path 50 (the rear end portion of the second area 52) to an intermediate portion of the first area 51 in the front to rear direction C. A constant portion 56 is disposed on the remaining portion of the first area 51 (the portion other than the first expanded portion 53), the constant portion 56 having the separation distance d constant in the front to rear direction C.

<Flow Path>

As shown in FIG. 2, the flow path 60 is formed between the batteries 2 (the battery modules 7) and the second wall surface 32 of the chassis 3, the flow path 60 being configured to introduce, to the air introduction path 50, the air blown from the blowing portion 5a of the blower 5. In the present embodiment, the flow path 60 extends outward (rightward) from the housing chamber 13 in the upper to lower direction.

In the present embodiment, the flow path 60 is constituted of the second wall surface 32 and outer surfaces (right surfaces) 7b of the battery modules 7, the outer surfaces (right surfaces) 7b being opposed to the second wall surface 32. That is, a wall surface (the second wall surface 32) of the chassis 3 constitutes a part of the flow path 60. In other words, the flow path 60 is formed without including a duct separated from the chassis 3. The flow path 60 is disposed to the right of the plurality of battery modules 7 over the entire area of the right surfaces of the plurality of battery modules 7 (the module assembly 20).

A cross-sectional area (a cross-sectional area perpendicular to the right to left direction) of at least a part of the air introduction path 50 is larger than a cross-sectional area (a cross-sectional area perpendicular to the upper to lower direction) of the flow path 60. In this manner, the air in the air introduction path 50 flows into the housing chamber 13 due to a pressure difference between a pressure in the air introduction path 50 and a pressure in the housing chamber 13. Thus, the air in the air introduction path 50 is introduced homogenously into the spaces formed between the plurality of batteries 2, and thereby the batteries 2 are cooled efficiently.

In particular, in the case where the batteries 2 are the battery modules 7 (that is, in the present embodiment), the air in the air introduction path 50 is introduced homogenously into the spaces formed between the plurality of battery modules 7 (into the inter-module paths 12). In the case where the batteries 2 are the battery cells 8, the air in the air introduction path 50 is introduced homogenously into the spaces formed between the plurality of battery cells 8 (into the inter-cell paths 11).

An entrance end portion 50*a* that is an end portion disposed on an entrance side of the air introduction path 50 is not directly coupled to an exit end portion 60*a* that is an end portion disposed on an exit side of the flow path 60, and is coupled to the exit end portion 60*a* by a second direction conversion part 30*b* described later. A cross-sectional area of a path of the entrance end portion 50*a* is larger than a cross-sectional area of a path of the exit end portion 60*a*.

In this manner, regarding the air flowing from the exit end portion 60*a* of the flow path 60 into the entrance end portion 50*a* of the air introduction path 50, a flow speed of the air is reduced in the entrance end portion 50*a*, and then the flow speed of the air flowing in the air introduction path 50 is reduced. Thus, the volumes of the air flowing into the spaces formed between the plurality of batteries 2 are suppressed from being varied. In this manner, the battery modules 7 and the battery cells 8 are cooled efficiently.

Meanwhile, the cross-sectional area of path of the entrance end portion 50*a* is an area of a surface (an opening) obtained by cutting off the air introduction path 50 at a position that is perpendicular to the upper surfaces of the battery modules 7 (the surfaces on the side of the first wall surface 31) and passes through a boundary portion between the first wall surface 31 and the inner surface of the second inclining wall 44. In addition, the cross-sectional area of path of the exit end portion 60*a* is an area of a surface (an opening) obtained by cutting off the flow path 60 at a position that is perpendicular to the right surfaces of the battery modules 7 (the surfaces on the side of the second wall surface 32) and passes through the second wall surfaces 32 and the upper end portions of the right surfaces.

Moreover, the spaces formed between the plurality of batteries 2 are spaces (the inter-module paths 12) formed between the battery modules 7 in the case where the batteries 2 are the battery modules 7 (in the present embodiment). Meanwhile, the spaces formed between the plurality of batteries 2 are spaces (the inter-cell paths 11) formed between the battery cells 8 in the case where the batteries 2 are the battery cells 8.

A cross-sectional area of path of the air introduction path 50 is larger than a cross-sectional area of path of the exit end portion 60*a* of the flow path 60 in a section (an introducing section) from the entrance end portion 50*a* of the air introduction path 50 to a portion facing the first intake portion 17A. In this manner, a flow speed of the air in the introducing section 50*b* is reduced.

Thus, in the case where a plurality of the first intake portions 17A are disposed being arranged in the front to rear direction F, the volumes of the air flowing into the plurality of first intake portions 17A facing the introducing section 50*b* are suppressed from being varied. As the result, the volumes of the air flowing into the spaces (the inter-module paths 12) formed between the plurality of battery modules 7 are suppressed from being varied.

Meanwhile, in the present invention, the cross-sectional area of a portion having the minimum cross-sectional area of path of the air introduction path 50 (the minimum cross-sectional area of path) may be constituted to be larger than the cross-sectional area of a portion having the maximum cross-sectional area of path of the flow path 60 (the maximum cross-sectional area of path). Also in the configuration, the flow speed of the air in the air introduction path 50 is reduced, and the volumes of the air flowing into the spaces formed between the plurality of batteries 2 are suppressed from being varied.

<Housing Chamber>

The housing chamber 13 is a chamber configured to house the batteries 2 (the battery modules 7). The air introduced into the air introduction path 50 is taken into the housing chamber 13. The housing chamber 13 has an intake portion configured to take the air introduced into the air introduction path 50. As shown in FIG. 2, the intake includes the first intake portion 17A and a second intake portion 23.

As shown in FIG. 6 and the like, the first intake portion 17A is disposed on the cover 14 of the housing 4. As shown in FIG. 2, the first intake portion 17A is disposed on the side of the air introduction path 50 (the side of the first wall surface 31), and faces the first inter-module path 12A. The air introduced to the air introduction path 50 is taken from the first intake portion 17A into the first inter-module path 12A.

The first intake portion 17A is separated from the second inter-module path 12B by at least one of the battery modules 7 (one battery module 7 in the present embodiment) such that the airs having passed through the inter-cell paths 11 of the plurality of battery modules 7 arranged next to the second inter-module path 12B and adjacent each other are confluent and introduced.

As shown in FIG. 6, FIG. 7, and FIG. 10, the second intake portion 23 is arranged between the first side plate 151*b* of the housing 4 and the second side plate 152*b*. That is, the second intake portion 23 is constituted of the first side plate 151*b* and the second side plate 152*b*. The second intake portion 23 is arranged on an end portion of the plurality of the battery modules 7 in the parallel arrangement direction (in the first parallel arrangement direction).

In particular, the second intake portion 23 is arranged on one end side (the right side) of the plurality of the battery modules 7 in the first parallel arrangement direction. Another second intake portion 23 is arranged on the other end side (the left side) of the plurality of the battery modules 7 in the first parallel arrangement direction. The second intake portion 23 arranged on one end side (the right side) in the first parallel arrangement direction may be referred to as "a second intake portion 23A" below, and the other second intake portion 23 arranged on the other end side (the left side) in the first parallel arrangement direction may be referred to as "a second intake portion 23B" below.

As shown in FIG. 2 and FIG. 7, the second intake portion 23A is arranged on the side of the second wall surface 32 (the right side) of the chassis 2, and faces the flow path 60. The second intake portion 23B is arranged on the side of the fourth wall surface 34 (the left side) of the chassis 2, and faces an intermediate path 75 described below. The second intake portions 23A and 23B face the inter-cell path 11 of the battery module 7. In this manner, the airs introduced to the flow path 60 and the intermediate path 75 are taken from the second intake portions 23A and 23B into the inter-cell path 11.

As shown in FIG. 2, FIG. 6, and FIG. 10, the housing chamber 13 has the sending portions 16 (the first sending portion 161 and the second sending portion 162) configured to send the air taken from the intake portions (the first intake portion 17A and the second intake portion 23) into the housing chamber 13.

The sending portions 16 are arranged on a lower side of the housing chamber 13 (on the side of the blower 5). The sending portions 16 face the second inter-module path 12B. The sending portions 16 is separated from the first inter-module path 12A by at least one of the battery modules 7 (one battery module 7 in the present embodiment) such that the airs flow in the inter-cell paths 11 of the plurality of battery modules 7 arranged next to the first inter-module path 12A and adjacent each other.

The first intake portion 17A and the sending portions 16 (the first sending portion 161 and the second sending portion 162) are arranged on the positions not corresponding to the plurality of the battery modules 7 in the first parallel arrangement direction (the left to right direction F). The first inter-module path 12A faces the first intake portion 17A, but does not face both of the first sending portion 161 and the second sending portion 162. The second inter-module path 12B faces either one of the first sending portion 161 and the second sending portion 162, but does not face the first intake portion 17A.

That is, the first intake portion 17A is not communicated directly (is communicated by the inter-cell path 11) with the sending portion 16. In this manner, the air taken from the first intake portion 17A into the housing chamber 13 is prevented from being sent from the sending portions 16 without passing through the inter-cell paths 11.

Then, referring to FIG. 2, the flow of the air passing through the housing chamber 13 will be explained.

The air taken from the first intake portion 17A into the housing chamber 13 flows downward (toward the side of the blower 5) passing through the first inter-module path 12A. The air is not sent from the sending portion 16 without passing through the inter-cell path 11 because the first inter-module path 12A does not face the sending portion 16.

The air flowing into the first inter-module path 12A is divided to and flown into each of the inter-cell paths 11 of the battery modules 7 arranged next to the first inter-module path 12A and adjacent each other. When passing through the inter-cell path 11, the air flowing from the first inter-module path 12A into the inter-cell path 11 removes the heat of the battery cells 8 and thereby cools the battery cells 8. And thus, the air is warmed and flows into the second inter-module path 12B.

The air taken from the second intake portion 23 into the housing chamber 13 flows into the inter-cell path 11. When passing through the inter-cell path 11, the air flowing from the second intake portion 23 into the inter-cell path 11 removes the heat of the battery cells 8 and thereby cools the battery cells 8. And thus, the air is warmed and flows into the second inter-module path 12B.

In the second inter-module path 12B, the air taken from the first intake portion 17A and flowing into the second inter-module path 12B is confluent with the air taken from the second intake portion 23 and flowing into the second inter-module path 12B. The confluent air flows downward in the second inter-module path 12B (toward the side of the blower 5), and is sent from the sending portion 16 facing the second inter-module path 12B.

In particular, the air having passed through the second inter-module path 12B arranged to the left is sent from the first sending portion 161, and the air having passed through the second inter-module path 12B arranged to the right is sent from the second sending portion 162. That is, both of the airs are sent from the sending portion 16 to the outside of the housing chamber 13. One of the airs is taken from the first intake portion 17A and has passed through the first inter-module path 12A, the inter-cell path 11, and the second inter-module path 12B in turn. The other one of the airs is taken from the second intake portion 23 and has passed through the inter-cell path 11 and the second inter-module path 12B in turn.

<Intake Chamber>

As shown in FIG. 2, the intake chamber 70 is formed between the third wall surface 33 and the batteries 2 (the battery modules 7). The intake chamber 70 is a chamber used by the intake portion 5b of the blower 5, the intake portion 5b being configured to take the air having passed through the housing chamber 13 and having cooled the batteries 2.

As shown in FIG. 2 and FIG. 8, the intake chamber 70 is constituted of the third wall surface 33, the lower surface 7c of the battery module 7 opposed to the third wall surface 33 (in more particular, a lower surface of the bottom plate (the partition plate) 15a of the bracket 15), the fourth wall surface 34, the fifth wall surface 35, the sixth wall surface 36, and a separating plate 27 described below, in the present embodiment.

In particular, the bottom lower portion 33d of the third wall surface 33 constitutes the lower surface of the intake chamber 70. The lower surface 7c of the battery module 7 constitutes an upper surface of the intake chamber 70. The left intermediate portion 34b and the left lower portion 34c of the fourth wall surface 34 constitute a left surface of the intake chamber 70. The rear intermediate portion 35b and the rear lower portion 35c of the fifth wall surface 35 constitute a rear surface of the intake chamber 70.

The front intermediate portion 36b and the front lower portion 36c of the sixth wall surface 36 constitute a front surface of the intake chamber 70. The separating plate 27 constitutes a right surface of the intake chamber 70. That is, the wall surfaces (the third wall surface 33, the fourth wall surface 34, the fifth wall surface 35, and the sixth wall surface 36) of the chassis 3 constitute a part of the intake chamber 70.

As shown in FIG. 2, the intake portion 5b of the blower 5 is arranged in the intake chamber 70. The intake chamber 70 is communicated with the housing chamber 13 by the sending portion 16. In this manner, the air sent from the sending portion 16 of the housing chamber 13 enters the intake chamber 70, and is taken from the intake portion 5b into the blower 5 in the intake chamber 70.

The intake chamber 70 has a housing area 70a and an area 70b other than the housing area 70a. The housing area 70a is configured to house the blower 5 and the heat exchanger 6. The housing area 70a is an area arranged below the bottom upper portion 33a of the third wall surface 33 (arranged on the side of the third wall surface 33). A first sealing member 61 described below is arranged in the housing area 70a. The area 70b other than the housing area 70a is an area arranged above the bottom upper portion 33a of the third wall surface 33 (arranged on the side of the first wall surface 31), and is positioned immediately below the bottom plate (the partition plate) 15a of the bracket 15.

The area 70b of the intake chamber 70 is constituted of the separation between the partition plate 15a of the housing 4 and the bottom upper portion 33a of the third wall surface 33 of the chassis 3. In other words, the housing 4 separates the partition plate 15a from the third wall surface 33, and thereby increases a volume of the area 70a other than the housing area 70a.

In this manner, the volume of the intake chamber 70 is increased in total, and thereby the pressure in the intake chamber 70 is decreased, As the result, the intake chamber 70 is under the pressure lower than the pressure in the housing chamber 13.

The housing area 70a of the intake chamber 70 includes a receiving path 70c. The receiving path 70c is formed between the third wall surface 33 and the heat exchanger 6. To be detailed, the receiving path 70c is formed between the bottom lower portion 33d of the third wall surface 33 and the heat exchanger 6, and is positioned on the lowest portion in the inner space of the chassis 3.

The receiving path 70c receives the air sent from the sending portion 16 of the housing chamber 13 and not having been cooled by the heat exchanger 6. The air received by the receiving path 70c flows toward the intake portion 5b of the blower 5, and passes through the heat exchanger 6, thereby being cooled. The air cooled by the heat exchanger 6 is taken into the intake portion 5b and is blown from the blowing portion 5a.

<Blowing Path>

A blowing path 80 is a path configured to receive the air blown from the blowing portion 5a of the blower 5, and faces the blowing portion 5a. As shown in FIG. 5, the blowing path 80 is disposed on a position close to one side (the rear side) of the plurality of battery modules 7 in the second parallel arrangement direction (in the front to rear direction). In other words, the blowing path 80 is disposed on a position separating from a center of the plurality of batteries 7 toward the one side (the rear side) in the second parallel arrangement direction.

As shown in FIG. 2, FIG. 6, FIG. 8, and FIG. 9, the blowing path 80 is arranged adjacent to the intake chamber 70 between the intake chamber 70 and the second wall surface 32. The intake chamber 70 is separated from the intake path 80 by the separating plate 27.

The blowing path 80 is constituted of the second wall surface 32, the third wall surface 33, the lower surface 7c of the battery module 7 opposed to the third wall surface 33 (in more particular, a lower surface of the bottom plate (the partition plate) 15a of the bracket 15), the fifth wall surface 35, the sixth wall surface 36, and the separating plate 27. In particular, the right intermediate portion 32b and the right lower portion 32c of the second wall surface 32 constitute a right surface of the blowing path 80.

The bottom lower portion 33d of the third wall surface 33 constitutes a lower surface of the intake chamber 70. The lower surface 7c of the battery module 7 constitutes an upper surface of the blowing path 80. The rear intermediate portion 35b of the fifth wall surface 35 constitutes a rear surface of the blowing path 80. The front intermediate portion 36b of the sixth wall surface 36 constitutes a front surface of the blowing path 80. The separating plate 27 constitutes a left surface of the blowing path 80.

That is, the wall surfaces (the second wall surface 32, the third wall surface 33, the fifth wall surface 35, and the sixth wall surface 6) of the chassis 3 constitute a part of the blowing path 80. In other words, the blowing path 80 is formed without including a duct separated from the chassis 3.

As shown in FIG. 2 and the like, the blowing path 80 is communicated with the flow path 60. To be detailed, the blowing path 80 and the flow path 60 constitutes a communication path 65 that passes outside the housing chamber 13 and couples the blowing portion 5a and the air introduction path 50 to each other. In other words, the communication path 65 couples the blowing portion 5a and the air introduction path 50 to each other without passing through the housing chamber 13.

It is preferred that the cross-sectional area (a path cross-sectional area) of the flow path 60 (an cross-sectional area perpendicular in the upper to lower direction) is larger than the cross-sectional area (a path cross-sectional area) of the blowing path 80 (an cross-sectional area perpendicular in the right to left direction). A flow speed of the air introduced from the blowing path 80 into the flow path 60 is reduced because the path cross-sectional area of the flow path 60 is larger than the path cross-sectional area of the blowing path 80.

In this manner, regarding the air introduced from the blowing path 80 to the flow path 60, the heat changing between the air and the second wall surface 32 is suppressed in the flow path 60 through which the air passes.

As shown in FIG. 8 and FIG. 9, the separating plate 27 is arranged between a first side wall 45 and a second side wall 46, the separating plate 27 being configured to separate the blowing path 80 from the intake chamber 70. The first side wall 45 is constituted of the rear intermediate portion 35b and the rear lower portion 35c of the fifth wall surface 35. The second side wall 46 is constituted of the front intermediate portion 36b and the front lower portion 36c of the sixth wall surface 36.

The first side wall 45 constitutes a part of the intake chamber 70 and a part of the blowing path 80. The second side wall 46 constitutes a part of the blowing path 80 and a part of the intake chamber 70 opposed to the first side wall 45. The first side wall 45 and the second side wall 46 are connected to the third wall surface 33.

As shown in FIG. 2, FIG. 3, FIG. 8, and FIG. 9, the separating plate 27 has a first plate portion 27a and a second plate portion 27b. The first plate portion 27a is arranged opposed to the lower surface of the partition plate 15a (a surface arranged on the side of the third wall surface 33). The second plate portion 27b is extended from the first plate portion 27a in a direction separating from the partition plate 15a (on the side of the third wall surface 33). The second plate portion 27b is arranged over from the first side wall 45 to the second side wall 46. An opening portion is formed on the second plate portion 27b.

The opening portion 27c has a rectangular shape, and an upper edge of the opening portion 27c is positioned on an upper end of the second plate portion 27b (on a boundary portion between the first plate portion 27a and the second plate portion 27b). The air introduction tube 5e is connected to a front side of the opening portion 27c (on the side of the fourth wall surface 34), the air introduction tube 5e being attached to the blowing portion 5a of the blower 5. In this manner, the air blown from the blowing portion 5a is certainly introduced to the opening portion 27c by the air introduction tube 5e, then passes through the opening portion 27c, and thus is introduced to the blowing path 80.

As shown in FIG. 2, the first sealing member 61 seals between the first plate portion 27a and the partition plate 15a. Another seal member (not shown in the drawings) seals between the lower end of the second plate portion 27b and the second bottom intermediate portion 33c of the third wall surface 33. Further another seal member (not shown in the drawings) seals between the rear end of the second plate portion 27b and the first side wall 45. Further another seal member (not shown in the drawings) seals between the front end of the second plate portion 27b and the second side wall 46.

In this manner, the blowing path 80 is air-tightly separated from the intake chamber 70 by the separating plate 27 at the portion except for the opening portion 27c. Thus, the air passing through the opening portion 27c from the blowing portion 5a and being blown to the blowing path 80 is prevented from directly returning to the intake chamber 70 (prevented from returning without passing through the housing chamber 13).

In addition, the separating plate 27 is disposed closer to the second wall surface 32 than to the sending portion 16. In this manner, the air in the housing chamber 13 is not prevented by the separating plate 27 from being sent from the sending portion 16. Furthermore, the air sent from the sending portion 16 is prevented from being directly introduced to the blowing path 80 (prevented from being introduced to the blowing path 80 without passing through the intake chamber 70).

<Blow Path>

The air introduction path 50, the flow path 60, and the blowing path 80 described above constitute a blow path 30. As shown in FIG. 2, the blow path 30 is a path in which the air blown from the blowing portion 5a flows to be introduced to the batteries 2 (the battery modules 7).

The blow path 30 is formed between the battery modules 7 and the wall surfaces of the chassis 3 (the first wall surface 31, the second wall surface 32, the third wall surface 33, the fifth wall surface 35, and the sixth wall surface 36). In the present embodiment, the blow path 30 is constituted of the wall surfaces of the chassis 3 (the first wall surface 31, the second wall surface 32, the third wall surface 33, the fifth wall surface 35, and the sixth wall surface 36) and an outer surface of the battery module 7, the outer surface being opposed to the wall surfaces, (in particular, an outer surface of the housing 4).

That is, the wall surfaces of the chassis 3 (the first wall surface 31, the second wall surface 32, the third wall surface 33, the fifth wall surface 35, and the sixth wall surface 36) constitute a part of the blow path 30. In other words, the blow path 30 is formed without including a duct separated from the chassis 3.

The wall surface (an inner wall surface) constituting the blow path 30 has a direction changing portion configured to change a direction of the blow path 30. In the present embodiment, the direction changing portion includes a first direction changing portion 30a, a second changing portion 30b, and a third changing portion 30c. The first direction changing portion 30a is constituted of a corner portion connecting the second wall surface 32 and the third wall surface 33 to each other.

The second direction changing portion 30b is constituted of an inner surface of the second inclining wall 44 connecting the second wall surface 32 and the first wall surface 31 to each other. The third direction changing portion 30c is constituted of an inner surface of the first inclining wall 43 and a corner portion connecting the first wall surface 31 and the fourth wall surface 34 to each other. The air flowing in the blow path 30 hits the wall surface (the inner wall surface) in the direction changing portions mentioned above (the first direction changing portion 30a, the second direction changing portion 30b, the third direction changing portion 30c), and thereby changes a direction of flowing.

A heat-insulating portion 47 is disposed at least on a portion including the direction changing portions (the first direction changing portion 30a, the second direction changing portion 30b, and the third direction changing portion 30c), the portion being included in the wall surface (the inner wall surface) constituting the blow path 30 of the chassis 3. In the present embodiment, the heat-insulating portion 47 is disposed over the second wall surface 32, the first direction changing portion 30a, and the second bottom intermediate portion 33c of the third wall surface 33.

That is, in the present embodiment, the heat-insulating portion 47 is disposed on, of the wall surface of the chassis 3, a wall surface (the second wall surface 32) of a portion constituting the flow path 60, a wall surface (the third wall surface 33 and the second bottom intermediate portion 33c) of a portion constituting the blowing path 80, and a wall surface (the first direction changing portion 30a) of a portion connecting the blowing path 80 and the flow path 60 to each other.

The heat insulating portion 47 is constituted by applying a heat-insulating member (for example, the foamed synthetic resin and the like) on the wall surface (the inner wall surface) constituting the blow path 30 of the chassis 3. Meanwhile, the heat-insulating member may be applied not only to the inner wall surface of the chassis 3 but also to an outer wall surface of the chassis 3. In addition, the member constituting the wall surface of the chassis may employ the heat-insulating member.

The heat-insulating portion 47 is disposed at least on a portion including the direction changing portions, the portion being included in the wall surface (the inner wall surface) constituting the blow path 30 of the chassis 3, and thus the air is suppressed from the heat exchanging on the wall surface of the blow path 30 in the direction changing in the blow path 30 (in the hitting to the wall surface), the air being blown from the blower 5 and being to be introduced to the battery module 7. In this manner, a temperature of the air to be introduced to the battery module 7 is prevented from being increased in the middle of the flowing in the blow path 30, and thereby the cooling efficiency to the battery module 7 is improved.

Additionally in the present embodiment, an cross-sectional area of the flow path 60 is formed to be smaller than the cross-sectional area of the air introduction path 50. Since the heat-insulating portion 47 is disposed on the portion including the second wall surface 32 that forms the flow path 60, the heat-insulating portion 47 disposed on the second wall surface 32 is capable of suppressing the heat exchanging between the air and the second wall surface 32 even in the flow path 60 where the flow speed is faster than a flow speed in the air introduction path 50 and thus the heat exchanging to the second wall surface 32 tends to be promoted.

In addition, the heat-insulating portion 47 is also disposed on the third wall surface 33 forming the blowing path 80, thereby suppressing the heat exchanging between the third wall surface 33 and the air flowing in the blowing path 80.

<Intermediate Path>

The intermediate path 75 facing the second intake portion 23B of the housing chamber 13 is a path into which the air having passed through the air introduction path 50. The intermediate path 75 introduces the air having passed through the air introduction path 50 to the second intake portion 23B, and supplies the air to the housing chamber 13.

As shown in FIG. 2, the intermediate path 75 is formed between the battery module 7 and the left upper portion 34a of the fourth wall surface 34. In the present embodiment, the intermediate path 75 is constituted of the fourth wall surface 34 and the front surface of the battery module 7, the front surface being opposed to the fourth wall surface 34. That is, the fourth wall surface 34 of the chassis 3 constitutes a part of the intermediate path 75. In other words, the intermediate path 75 is formed without including a duct separated from the chassis 3.

The intermediate path 75 extends in the upper to lower direction on the left side of the housing chamber 13 (on a side opposed to the flow path 60), and faces the second intake portion 23B. An upper end portion of the intermediate path 75 is communicated with an exit end portion 50c of the air introduction path 50. In this manner, the air having reached the exit end portion 50c in the air introduction path 50 is introduced to the intermediate path 75. The air introduced to the intermediate path 75 is taken from the second intake portion 23B into the housing chamber 13.

<Sealing Member>

As shown in FIG. 2 to FIG. 4 and FIG. 7, the sealing members 61 to 63 are disposed in the inner space of the chassis 3. The sealing members 61 to 63 are disposed to prevent the air from being introduced to the intake chamber 70 without cooling the battery module 7 (without passing through the housing chamber 13), the air being blown from the blowing portion 5a of the blower 5. The sealing members include the first sealing member 61, the second sealing member 62, and the third sealing member 63.

As shown in FIG. 2, the first sealing member 61 is disposed being contacted to a whole area of a portion of the partition plate 15a (hereinafter referred to as "a corresponding portion"), the portion being positioned on the side of the third wall surface (an opposite wall surface) 33 of the partition plate 15a and not forming the sending portion 16. The first sealing member 61 seals between the corresponding portion of the partition plate 15a and the bottom upper portion 33a of the third wall surface 33.

In this manner, the first sealing member 61 seals between the partition plate 15a and the third wall surface (the opposite wall surface) 33 without shielding the sending portion 16. Thus, the air blown from the blower 5 is prevented without blocking the sending of air from the sending portion 16 from directly entering the intake chamber 70 from a space between the third wall surface (the opposite wall surface) 33 and the partition plate 15a (entering the intake chamber 70 without passing through the housing chamber 13).

In addition, the first sealing member 61 seals between the corresponding portion of the partition plate 15a and the first plate portion 27a of the partition plate 27. In this manner, the air blown from the blowing portion 5a to the blowing path 80 is prevented from passing between the first plate portion 27a and the partition plate 15a to enter the intake chamber 70.

As shown in FIG. 3, FIG. 4, and FIG. 7, the second sealing member 62 seals between the sixth wall surface (the first vertical wall surface) 36 and the first side plate 151b of the housing 4 and between the fifth wall surface (the second vertical wall surface) 35 and the second side plate 152b of the housing 4. In this manner, the air blown from the blower 5 is prevented from directly entering the intake chamber 70 from between the sixth wall surface 36 and the first side plate 151b and between the fifth wall surface 35 and the second side plate 152b (from entering the intake chamber 70 without passing through the housing chamber 13).

As shown in FIG. 3, FIG. 4, and FIG. 7, the third sealing member 63 seals between the battery modules 7 adjacent to each other in the second parallel direction (in the front to rear direction C). In this manner, the air taken from the first intake portion 17A into the housing chamber 13 is prevented from being directly sent from the sending portion 16 (from being sent from the sending portion 16 without passing through the inter-cell path 11).

<Flow of Air>

Referring to FIG. 2, the flow of air in the inner space of the chassis 3 will be explained here. In FIG. 2, a flow of cool air not yet having removed the heat of the battery cells 8 is indicated by a white arrowed line, and a flow of warm air having removed the heat of the battery cells 8 is indicated by a black arrowed line.

The air blown from the blowing portion 5a of the blower is introduced by the air introduction tube 5e to the opening portion 27c of the separating plate 27, and passes through the opening portion 27c to flow into the blowing path 80. After flowing toward the side of the second wall surface 32 (toward the right side), the air flown into the blowing path 80 hits the first direction changing portion 30a, thereby changes a direction of the flowing, and flows into the flow path 60.

After flowing from the side of the third wall surface 33 (the lower side) toward the side of the first wall surface 31 (the upper side), the air flown into the flow path 60 hits the second direction changing portion 30b, thereby changes a direction of the flowing, and flows into the air introduction path 50. A part of the air flowing into the flow path 60 is taken from the second intake portion 23A into the housing chamber 13 without flowing into the air introduction path 50, and flows into the inter-cell path 11.

The air flowing to the air introduction path 50 flows from the side of the second wall surface 32 (the right side) toward the side of the fourth wall surface 34 (the left side). The air blown from the blower 5 continuously flows into the air introduction path 50, and thereby is under a pressure higher than the pressure in the housing chamber 13. Thus, the air flowing in the air introduction path 50 is taken from the first intake portion 17A into the housing chamber 13.

A part of the air flowing in the air introduction path 50 hits the third direction changing portion 30c, thereby changes a direction of the flowing, and flows into the intermediate path 75. The air flowing into the intermediate path 75 is taken from the second intake portion 23B into the housing chamber 13, and flows into the inter-cell path 11.

After flowing into the first inter-module path 12A, the air taken from the first intake portion 17A into the housing chamber 13 flows into the inter-cell path 11 of each of the plurality of battery modules 7 arranged next to the first inter-module path 12A and adjacent each other.

The air flowing from the first inter-module path 12A into the inter-cell path 11 and the air flowing from the second intake portions 23A and 23B into the inter-cell path 11 remove the heat of the battery cells 8 in passing through the inter-cell path 11, and are warmed to flow to the second inter-module path 12B.

The air flowing into the second inter-module path 12B passes through the sending portion 16 (the first sending portion 161 and the second sending portion 162), is sent to the outside of the housing chamber 13, and then flows into the intake chamber 70. The air flowing into the intake chamber 70 flows downward (toward the side of the third wall surface 33), and then flows into the receiving path 70c. After passing through the heat exchanger 6 and being cooled, the air flowing into the receiving path 70c is taken into the intake portion 5b of the blower 5, and is blown from the blowing portion 5a.

As described above, the air blown from the blower 5 circulates in the inner space of the chassis 3, and thereby cools the batteries 2. In this manner, the batteries 2 are prevented from deterioration of the performance caused by the increasing of temperature.

<Diffusing Portion>

As shown in FIG. 2, the diffusing portion 66 is arranged between the batteries 2 (the battery modules 7) and the first wall surface 31. The diffusing portion 66 diffuses the air into the inner space of the chassis 3, the air being blown from the blowing portion 5a of the blower 5. The diffusing portion 66 is disposed on the flow path 60, and diffuses the air that flows from the blowing path 80 into the flow path 60.

An arrowed line in FIG. 5 schematically illustrates the state where the air flowing into the flow path 60 is diffused by the diffusing portion 66.

The diffusing portion 66 may be a member other than (separating from) the chassis 3, and may be disposed as a part of the wall surface of the chassis 3. In the case where the diffusing portion 66 is disposed as a part of the wall surface of the chassis 3, the diffusing portion 66 is provided by protruding a part of the wall surface of the chassis 3 inward (toward the batteries 2) for example. In the case where the diffusing portion 66 is a member other than the chassis 3, the diffusing portion 66 may be attached to the chassis 3 and may be attached to the housing chamber 4.

In the present embodiment, the diffusing portion 66 is attached to the housing 4 in the flow path 60. The diffusing portion 66 is positioned on a center of the housing 4 in the front to rear direction C (in the second parallel arrangement direction of the battery modules 7). In addition, the diffusing portion 66 is positioned between an upper end of the battery module 7 and the lower end in the upper to lower direction.

As shown in FIG. 5 and FIG. 10, the diffusing portion 66 has an attachment plate 66a and a wind-regulating plate 66b.

The attachment plate 66a is arranged on an outside of the battery module 7 (on the side of the second wall surface 32) and extends in the upper to lower direction. The attachment plate 66a has a first attachment portion 66a1 and a second attachment portion 66a2. The first attachment 66a1 is positioned on a lower portion of the attachment plate 66a. The first attachment portion 66a 1 is attached to the bottom plate (the partition plate) 15a of the housing 4.

In particular, the first attachment portion 66a1 is attached to a center of an edge (a right edge) of the bottom plate 15a, the edge being arranged on the side of the flow path 60 (on the side of the second wall surface 32). The first attachment portion 66a1 extends downward being divided into two branches at an intermediate portion of the attachment plate 66a in the upper to lower direction. The second attachment portion 66a2 is positioned on an upper portion of the attachment plate 66a. The second attachment portion 66a2 is attached by a coupling member 67 to the first fixing portion 18 of the housing 4 (the bracket 15), the first fixing portion 18 being arranged on the side of the flow path 60 (on the side of the second wall surface 32). The coupling member 67 is a plate member extending in the front to rear direction, and couples the first fixing portion 18 on the right front portion, the second attachment portion 66a2, and the first fixing portion 18 on the right rear portion to each other.

The wind-regulating plate 66b is disposed on an intermediate portion 66a3 (a portion between the first attachment portion 66a1 and the second attachment portion 66a2) of the attachment plate 66a in the upper to lower direction. The wind-regulating plate 66b has a base portion 66b1, an inclining portion 66b2, and a tip end portion 66b3. The base portion 66b1, the inclining portion 66b2, and the tip end portion 66b3 are formed of a single plate member bent to form the wind-regulating plate 66b. The base portion 66b1 is disposed on an upper portion of the wind-regulating plate 66b, and is attached to the intermediate portion 66a3 of the attachment plate 66a. The inclining portion 66b2 is extended downward diagonally from the base portion 66b1.

To be detailed, the inclining portion 66b2 is disposed extending downward in a direction separating from the base portion 66b1 (disposed on the side of the flow path 60). A width of the inclining portion 66b2 in the front to rear direction is larger than a width of the battery cell 8 in the front to rear direction and smaller than a width of the battery module 7 in the front to rear direction. The tip end portion 66b3 extends substantially-horizontally from an end of the extension of the inclining portion 66b2 toward the side of the flow path 60. The tip end portion 66b3 of the wind-regulating plate 66b is close to the second wall surface 32 of the chassis 3. A width of the tip end portion 66b3 in the front to rear direction is smaller than the width of the inclining portion 66b2 in the front to rear direction.

That is, the side of the second wall surface 32 of the inclining portion 66b2 includes a portion including the tip end portion 66b3 and a portion not including the tip end portion 66b3. In this manner, the air flowing in the flow path 60 on the side of the second wall surface 32 of the inclining portion 66b2 flows without hitting the wind-regulating plate 66b in the portion not including the tip end portion 66b3.

As shown in FIG. 5, the diffusing portion 66 is arranged to overlap the blowing portion 5a with at least a part of the diffusing portion 66 in the arrangement direction of the blower 5 and the battery module 7 (in the upper to lower direction I). In this manner, the air blown from the blowing portion 5a is hit to the diffusing portion 66 certainly, thereby being diffused.

In the present embodiment, as shown in FIG. 5, the diffusing portion 66 is arranged on a position closer to the sixth wall surface 36 (the front side) than to the center 5f of the blowing portion 5a in the front to rear direction. In more particular, a center line 66L of the diffusing portion 66 in the front to rear direction is arranged on a position closer to the sixth wall surface (the front side) than to the center 5f of the blowing portion 5a in the front to rear direction.

In addition, the center 5f of the blowing portion 5a is positioned between a front end portion of the diffusing portion 66 and the rear end portion in the front to rear direction. In particular, the center 5f of the blowing portion 5a is positioned in the front to rear direction between a front end portion of the inclining portion 66b2 and the rear end portion and between a front end portion of the tip end portion 66b3 and the rear end portion.

In other words, the blowing portion 5a is positioned to be overlapped with the inclining portion 66b2 and the tip end portion 66b3 in the front to rear direction C. In this manner, the air blown from the blowing portion 5a and flowing from the blowing path 80 into the flow path 60 hits the inclining portion 66b2 and the tip end portion 66b3 of the diffusing portion 66 in the middle of the flowing in the flow path 60, and thus is diffused in the front to rear direction C (in the second parallel arrangement direction).

The air hitting the diffusing portion 66 is diffused to be introduced to the air introduction path 50 under the state where an area of the flowing is increased and a speed of the flowing is reduced. That is, the air blown from the blowing portion 5a hits the diffusing portion 66 to be spread from a portion close to the blowing portion 5a toward a portion far from the blowing portion 5a in the front to rear direction, and thus is introduced to the air introduction path 50 under the state where a wind-speed distribution is averaged in the front to rear direction.

In this manner, the air in the air introduction path 50 is under a hydrostatic pressure in both of the first area 51 and the second area 52. In addition, the diffusing portion 66 diffuses the air blown from the blowing portion 5a in the inner space of the chassis 3 in accordance with proportions of opening areas of the plurality of first intake portions 17A and introduces the diffused air. To be detailed, the diffusing portion 66 diffuses the air blown from the blowing portion 5a to the first area 51 and the second area 52 on the basis of (in accordance with) a ratio of an opening area S1 of the first intake portion 17A to an opening area S2 of the first intake portion 17A and introduces the diffused air, the opening area S1 facing the first area 51, the opening area S2 facing the second area 51.

In this manner, that configuration suppresses variations between a volume of air flowing from the first intake portion 17A facing the first area 51 into the housing chamber 13 and a volume of air flowing from the first intake portion 17A facing the second area 52 into the housing chamber 13. Thus, that configuration suppresses variations in each of the volumes of airs passing through the plurality of batteries 2 housed in the housing chamber 13. As the result, the plurality of batteries 2 are cooled homogenously.

In the present embodiment, the opening area S1 is equivalent to the opening area S2. Thus, the diffusing portion 66 diffuses the air blown from the blowing portion 5a into the volume of air flowing into the first area 51 and the volume of air flowing into the second area 52 such that both of the volume are equivalent to each other, and introduces the diffused air to the first area 51 and the second area 52.

In addition, the first area 51 and the second area 52 are under a hydrostatic pressure higher than the pressure in the housing chamber 13. Thus, the airs diffused and introduced to the first area 51 and the second area 52 equally flow into the housing chamber 13 from the first intake portion 17A facing the first area 51 and from the first intake portion 17A facing the second area 52.

In this manner, that configuration prevents the short-circuit caused by the variations of the volumes of air flows, and thus homogenously cools the batteries 2 (the battery modules 7) housed on the housing chamber 13.

Meanwhile, the diffusing portion 66 is also capable of diffusing the sir into the first area 51 and the second area 52 on the basis of (in accordance with) a ratio of a volume V1 of the first area 51 to a volume V2 of the second area 52. In that case, the first area 51 and the second area 52 both include the airs under the hydrostatic pressure.

In that case, when a volume ratio between the first area 51 and the second area 52 is configured to be equivalent to the ratio between the opening area S1 and the opening area S2, the volume of air flowing into the first intake portion 17A facing the first area 51 and the volume of air flowing into the first intake portion 17A facing the second area 52 are equivalent to each other.

As a concrete method for the diffusing portion 66 to diffuse the air blown from the blowing portion 5a into the first area 51 and the second area 52 on the basis of the ratio between the opening area S1 and the opening area S2, values S1, S2, V1, and V2 are determined so as to satisfy a relational equation of the following equation (1), for example.

$$S1 \times (1/V1) = S2 \times (1/V2) \quad \text{Equation (1)}$$

where S1 is an opening area of the first intake portion 17A, the opening area facing the first area 51, S2 is an opening area of the first intake portion 17A, the opening area facing the second area 52, V1 is a volume of the first area 51, and V2 is a volume of the second area 52.

According to the equation (1) mentioned above, the airs diffused by the diffusing portion 66 and flowing into the air introduction path 50 flow homogenously into the first intake portion 17A facing the first area 51 and the first intake portion 17A facing the second area 52.

Meanwhile, the method for the diffusing portion 66 to diffuse the air blown from the blowing portion 5a into the first area 51 and the second area 52 in accordance with the proportion between the opening area S1 and the opening area S2 is not limited to the method based on the equation (1) mentioned above.

For example, in addition to or instead of the method based on the equation mentioned above, another method considering other facts may be employed, the facts including a cross-sectional area of each of the first area 51 and the second area 52 (a cross-sectional area of the entrance end portion 50a) and an inner shape of each of the first area 51 and the second area 52, the inner shape contributing a resistance of fluid.

Figure 14:
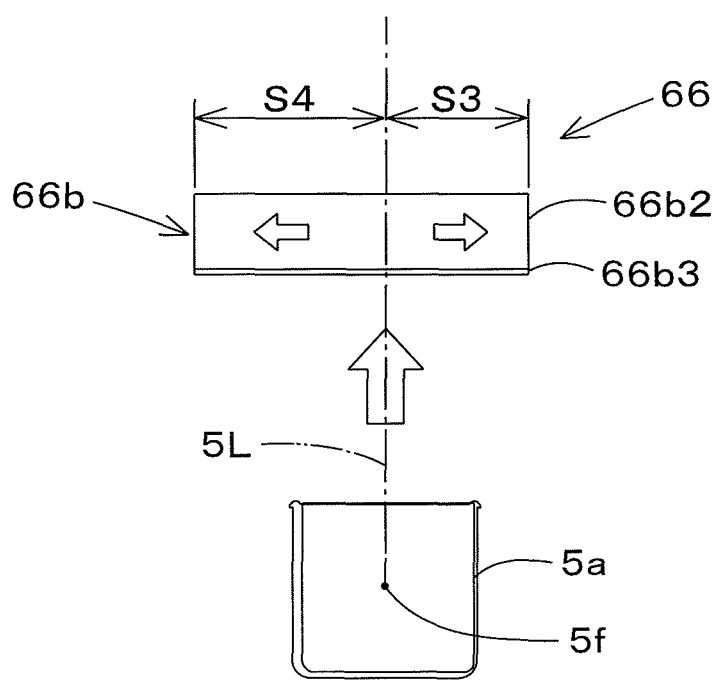
FIG. 14 is a view illustrating a first example of a diffusing portion according to the embodiment of the present invention.
Figure 15:
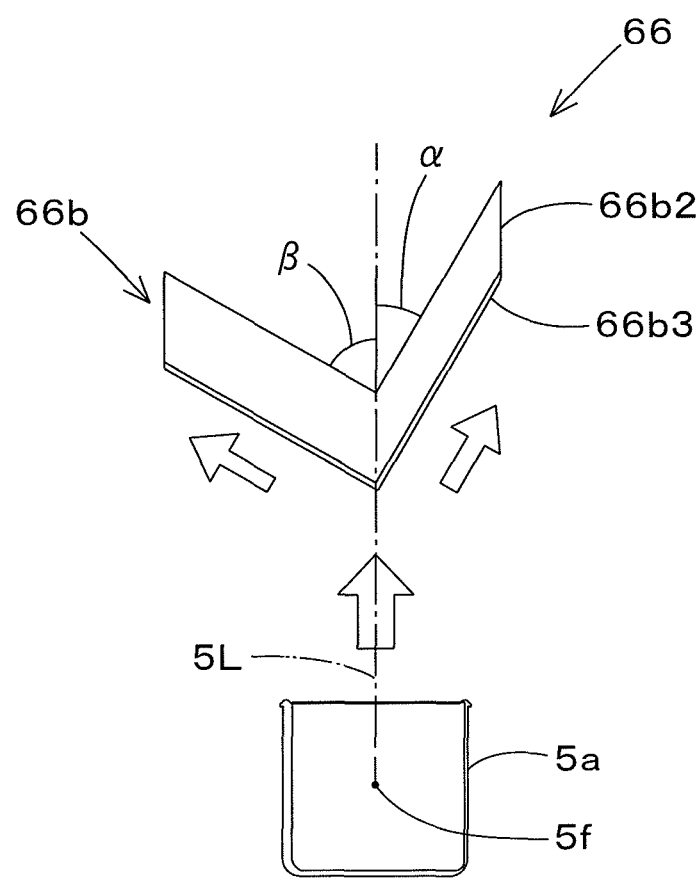
FIG. 15 is a view illustrating a second example of the diffusing portion according to the embodiment.
Figure 16:
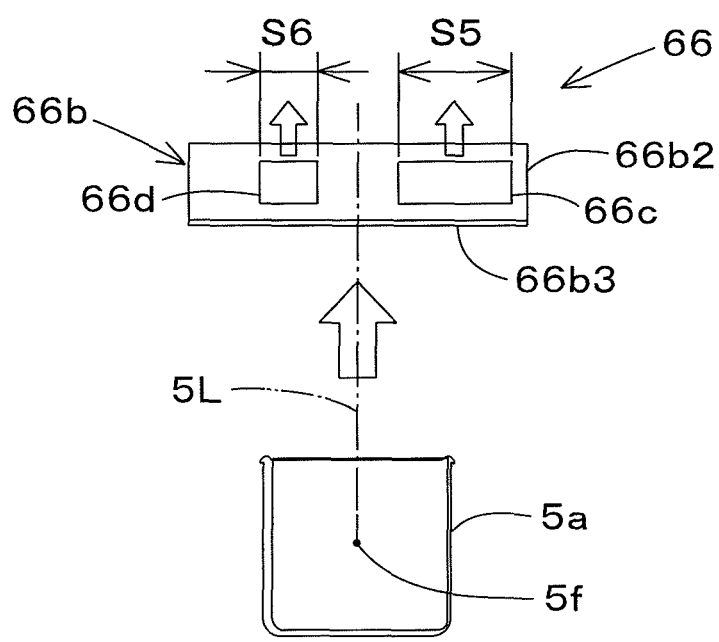
FIG. 16 is a view illustrating a third example of the diffusing portion according to the embodiment.

Examples for the diffusing portion 66 to diffuse and introduce the air blown from the blowing portion 5a to the inner space of the chassis 3 on the basis of the ratio between the opening areas of the plurality of first intake portions 17A (In particular, diffuse and introduce the air to the first area 51 and the second area 52 on the basis of the ratio between the opening area S1 and the opening area S2) are exemplified in FIG. 14 to FIG. 16. That is, FIG. 14 to FIG. 16 show examples of the diffusing portion 66.

FIG. 14 to FIG. 16 are views illustrating the inner space of the chassis 3 in a direction corresponding to FIG. 5, and extracts and illustrates only the blowing portion 5a of the blower 5 and the wind-regulating plate 66b of the diffusing portion 66. In FIG. 14 to FIG. 16, a straight line 5L indicated by a chain line corresponds to a straight line passing through the center 5f of the blowing portion 5a in the upper to lower direction (in the arrangement direction of the blower 5 and the batteries 2 (the battery modules 7)).

Meanwhile, in the following explanations, the wind-regulating plate 66b is separated into two portions (a first portion and a second portion) on the basis of the center 5f of the blowing portion 5a. However, the wind-regulating plate 66b may be separated into the first portion and the second portion on the basis of another portion (a portion other than the center 5f) of the blowing portion 5a. For example, in a case where the straight line 5L passing through the center 5f of the blowing portion 5a does not pass through the wind-regulating plate 66b, the wind-regulating plate 66b may be separated into the first portion and the second portion on the basis of another portion other than the center 5f (for example, an edge portion) of the blowing portion 5a.

In the example shown in FIG. 14 (a first example of the diffusing portion 66), regarding the wind-regulating plate 66b of the diffusing portion 66, an area S3 of a portion (hereinafter referred to as a first portion) positioned closer to the first area 51 than to the center 5f of the blowing portion 5a and an area S4 of a portion (hereinafter referred to as a second portion) positioned closer to the second area 52 than to the center 5f are determined based on the opening area S1 and the opening area S2.

For example, in the case where the value S1 is larger than the value S2 (S1>S2), the value S3 is determined to be smaller than the value S4 (S3<S4). In particular, the values are determined such that a ratio of the value S1 to the value S2 is equal to a ratio of the value S4 to the value S3 (S1:S2=S4:S3). Meanwhile, the area S3 and the area S4 are areas of the surfaces (wind-receiving surfaces) hit by the wind from the blowing portion 5a.

In the example shown in FIG. 15 (a second example of the diffusing portion 66), the wind-regulating plate 66b of the diffusing portion 66 is formed to have a bent shape (a V-shape) having a boundary line (a bending line) indicated by the straight line L5. To be detailed, regarding the wind-regulating plate 66b, an angle (an inner angle) α between the first portion and the straight line 5L and an angle (an inner angle) β between the second portion and the straight line 5L are determined on the basis of the opening area S1 and the opening area S2.

For example, in the case where the value S1 is larger than the value S2 (S1>S2), the angle α is determined to be smaller than the angle β (α<β). It is preferred to equalize the area of the first portion and the area of the second portion of the wind-regulating plate 66b. However, the areas of the first portion and the second portions may be different from each other.

In the example shown in FIG. 16 (a third example of the diffusing portion 66), regarding the wind-regulating plate 66b of the diffusing portion 66, the first portion and the second portion include openings of areas different from each other. To be detailed, an area S5 of an opening 66c included in the first portion and an area S6 of an opening 66c included in the first portion are determined on the basis of the opening area S1 and the opening area S2.

For example, in the case where the value S1 is larger than the value S2 (S1>S2), the value S5 is determined to be larger than the value S6 (S5<S6). In particular, the values are determined such that a ratio of the value S1 to the value S2 is equal to a ratio of the value S5 to the value S6 (S1:S2=S5:S6). It is preferred to equalize the area of the first portion of and the area of the second portion of the wind-regulating plate 66b. However, the areas of the first portion and the second portions may be different from each other.

The examples (the first to third embodiments) shown in FIG. 14 to FIG. 16 may be solely employed and may be employed in combination of two examples or more. For example, the configuration based on the area (shown in FIG. 14) and the configuration based on the angle (shown in FIG. 15) may be combined and employed.

In addition, the other facts described above (such as the inner shape of each of the first area 51 and the second area 52, the inner shape contributing a resistance of fluid) may be considered in employing the examples shown in FIG. 14 to FIG. 16.

<Specification of Power Source Apparatus>

The power source apparatus 1 has a configuration where the other side of the batteries 2 (the side of the first wall surface 31) in the chassis 3 is positioned far from a heat source arranged outside the chassis 3 (hereinafter referred to as an external heat source) than from the one side of the batteries 3 (the side of the third wall surface 33) in the chassis 3 under the installed state (under the operating state). The external heat source is an engine 113 of the working machine 100 described below, for example.

In that configuration, the air introduction path 50 is positioned far from the external heat source than from the blower 5. In this manner, the air introduced into the air introduction path 50 is prevented from being warmed by the external heat source, and the cooling efficiency of the batteries 2 is improved.

In addition, the power source apparatus 1 has a configuration where the third wall surface is arranged above the external heat source under the installed state. To be detailed, the power source apparatus 1 has a configuration where the third wall surface 33 is separated from the external heat source at a smaller distance compared to the first wall surface 31 in the upper to lower direction under the installed state. In that configuration, the third wall surface 33 is warmed by the external heat source.

Thus, in the case where a temperature of the air flowing inside the third wall surface 33 is low, the heat exchanging between the air and the third wall surface 33 is easily achieved. In the present embodiment, the receiving path 70c formed between the third wall surface 33 and the heat exchanger 6 receives the air not yet having been cooled by the heat exchanger 6, and thus a temperature of the air flowing in the receiving path 70c is high. Thus, the heat exchanging between the air and the third wall surface 33 is not easily achieved.

<Others>

The power source apparatus 1 has a battery management unit not shown in the drawings. The battery management unit is a device configured to manage an accumulation amount and the like of the batteries 2 of the power source apparatus 1. The battery management unit has an input circuit, a microcomputer, and an output circuit. A storing portion (a storage) of the microcomputer sequentially accumulates data of the batteries such as a battery voltage, a charging current, a discharging current, a battery temperature, and the like of the batteries 2.

In addition, the battery management unit is capable of working as a control device configured to control operations of the blower 5. The battery management unit is configured to communicate to various types of electronic control apparatus mounted on the working machine 100 described below.

The power source apparatus 1 according to the present invention is mounted on a vehicle, for example. The vehicle is a hybrid vehicle employing a drive source that combines an engine and a motor, an electric vehicle employing an electric motor as the drive source, and the like. The vehicle includes a working vehicle having an operation device (a working machine) in addition to an automobile.

In addition, the power source apparatus 1 may be mounted on a moving machine other than the vehicle, for example, on an air plane and a vessel. The power source apparatus 1 may be mounted not only on the moving machine but also on other devices (a stationary device and the like).

<Working Machine>

Figure 17:
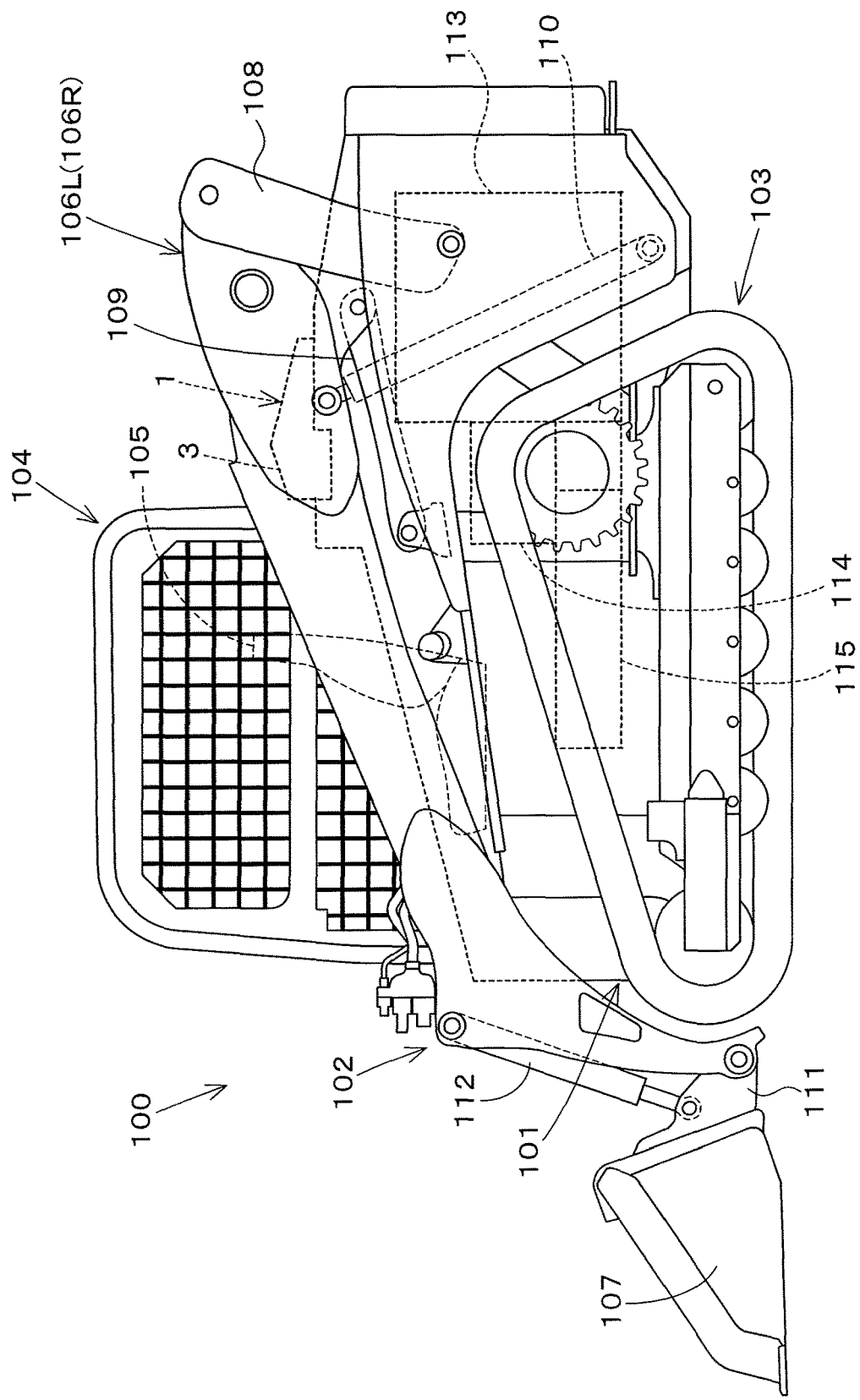
FIG. 17 is a side surface view illustrating a working machine according to the embodiment of the present invention.

FIG. 17 is a side view illustrating the working machine 100 according to the embodiment of the present invention. FIG. 17 shows a compact track loader as an example of the working machine 100. However, the working machine 100 according to the present embodiment is not limited to the compact track loader, and may be other types of working machines (a working vehicle) such as a skid steer loader.

The working machine 100 includes a machine body 101, an operation device 102 attached to the machine body 101, and a travel device 103 supporting the machine body 101.

In explanations of the working machine 100, a forward direction (a direction to the left in FIG. 17) corresponds to a front side of an operator seated on an operator seat 105 of the working machine 100, a backward direction (a direction to the right in FIG. 17) corresponds to a back side of the operator, a leftward direction (a direction vertically extending from a back surface to a front surface of FIG. 17) corresponds to a left side of the operator, and a rightward direction (a direction vertically extending from the front surface to the back surface of FIG. 17) corresponds to a right side of the operator. In addition, a direction called a machine width direction corresponds to a horizontal direction that is a direction perpendicular to the front to rear direction of the machine body 101.

A cabin 104 is mounted on a front upper portion of the machine body 101. The operator seat 105 is arranged in the cabin 104. The travel devices 103 are arranged on a right lower portion of and a left lower portion of the machine body 101, and configured to be driven by a hydraulic pressure.

The operation device 102 includes a boom 106L disposed to the left, a boom 106R disposed to the right, and an operation tool 107 attached to the tip ends of the booms 106L and 106R. The operation tool 107 is a bucket in the present embodiment. However, another operation tool may be attached to the booms instead of the bucket. The booms 106L and 106R are supported by a first lift link 108 and the second lift link 109.

The booms 106L and 106R are swung upward and downward by a lift cylinder 110 constituted of a hydraulic cylinder that is configured to be stretched and shortened. The operation tool 107 is attached to the tip ends of the booms 106L and 106R by an attachment bracket 111. The operation tool 107 is swung (in a shoveling movement and a dumping movement) by a tilt cylinder 112 constituted of a hydraulic cylinder that is configured to be stretched and shortened.

As shown in FIG. 17, the machine body 101 is provided with an engine (a diesel engine) 113, a rotating electrical apparatus 114, and a drive device 115.

The engine 113 is arranged on a rear portion of the machine body 101. The engine 113 generates a motive power supplied to drive the operation device 102.

The rotating electrical apparatus 114 is constituted of any one of an electric power generator, an electric motor, and an electric motor generator (a motor generator). In the present embodiment, the rotating electrical apparatus 114 employs the motor generator. The rotating electrical apparatus 114 is arranged forward from the engine 113.

The drive device 115 is a device configured to be driven by the engine 113 and/or the rotating electrical apparatus 114 and to generate a motive power mainly to drive the operation device 102. In particular, the drive device 115 is a hydraulic actuator. The hydraulic actuator includes a hydraulic pump configured to supply an operation fluid to a hydraulic device mounted on the working machine 100.

In addition, the power source apparatus 1 is arranged on the machine body 101.

The upper, lower, left, and right directions of the power source apparatus 1 (the directions indicated by the arrowed lines in FIG. 1 to FIG. 8) previously explained (defined) are identical to the upper, lower, left, and right directions of the working machine 100. Thus, the first wall surface 31 of the chassis 3 is arranged on the upper side of the working machine 100, the second wall surface 32 is arranged on the right side of the working machine 100, the third wall surface 33 is arranged on the lower side of the working machine 100, the fourth wall surface 34 is arranged on the left side of the working machine 100, the fifth wall surface 35 is arranged on the rear side of the working machine 100, and the sixth wall surface 36 is arranged on the front side of the working machine 100, respectively.

The power source apparatus 1 accumulates the electric power generated by the rotating electrical apparatus 114 and supplies the accumulated electric power to the rotating electrical apparatus 114 and the like. The configuration of the power source apparatus 1 is explained above. The power source apparatus 1 is arranged around the engine 113, and is exposed to the heat generated by the engine 113.

In the present embodiment, the power source apparatus 1 is arranged above the engine 113. However, the power source apparatus 1 may be arranged to the right of the engine 113, arranged to the left of the engine 113, arranged below the engine 113, arranged behind the engine 113, and the like. When the power source apparatus 1 is arranged around the engine 113, an atmosphere temperature around the power source apparatus 1 can be increased by the heat (the radiation heat) to a temperature zone in which the power source apparatus 1 operates efficiently, the radiation heat being generated by the engine 113.

Thus, the power source apparatus 1 is warmed by the driving of the engine 113 without a heater for warming the power source apparatus 1. In addition, when the power source apparatus 1 is arranged above the engine 113, the temperature of the power source apparatus 1 is quickly increased. In this manner, the power source apparatus 1 starts up in a short time even in the case where the working machine 100 is driven in the cold district and the like.

The engine 113 is arranged on an outside portion of the chassis 3 of the power source apparatus 1 (below the power source apparatus 1), the outside portion being positioned on the side of the third wall surface 33. As the result, the engine 113 is positioned below the wall surface (the second wall surface 32 and the third wall surface 33) on which the heat-insulating portion 47 of the chassis 3 is disposed (refer to FIG. 2).

In this manner, the heat-insulating portion 47 suppresses the heat on the wall surface from conducting to the inner space of the chassis 3 even when the air warmed by the heat (the radiation heat) moves upward in the machine body 101, the heat being generated by the engine 113 and the heat warms the wall surface (the second wall surface 32 and the third wall surface 33) of the chassis 3. Thus, the heat-insulating portion 47 prevents the cooling efficiency of the batteries 2 obtained by the driving of the blower 5 from being deteriorated due to the temperature increased in the inner space of the chassis 3 by the heat generated by the engine 113.

The engine 113 is arranged on an outside portion of the chassis of the power source apparatus 1 (below the chassis 3), the outside portion being positioned on the side of the third wall surface 33. That is, the engine 113 is arranged on an outside portion opposite to the air introduction path 50 of the chassis 3. In this manner, the air not yet having flown from the air introduction path 50 of the chassis 3 into the housing chamber 13 is prevented from being warmed by the heat that is generated by the engine 113, and thereby the cooling efficiency of the batteries is improved.

The working machine 100 is capable of driving the drive device 115 with use of the driving power of the engine 113, driving the drive device 115 with used of both of the engine 113 and the rotating electrical apparatus 114, and generating electricity by activating the rotating electrical apparatus 114 with use of the driving power of the engine 113. That is, the working machine 100 according to the present embodiment is a working machine employing the parallel hybrid system.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

What is claimed is:

1. A power source apparatus comprising:
a battery module including a plurality of battery cells;
a housing forming a housing chamber to house and arrange a plurality of the battery modules in parallel;
a blower to blow air;
a chassis storing the housing and the blower;
an inter-module path formed between the battery modules adjacent to each other; and
an inter-cell path formed between the battery cells adjacent to each other,
wherein the inter-module path and the inter-cell path are arranged inside the housing,
wherein the housing includes:
an intake portion to take the air into the housing chamber, the air being blown from the blower; and
a sending portion to send the air from the housing chamber, the air being taken from the intake portion and passing through the inter-module path and the inter-cell path,
wherein the intake portion takes, into the housing chamber, the air being present inside the chassis and outside the housing,
wherein the sending portion sends the air present in the housing chamber to outside of the housing inside the chassis,
wherein the inter-module path has
a first inter-module path serving as a path into which the air is introduced, the air being taken from the intake portion and not yet having passed through the inter-cell path,
and wherein the sending portion is separated, adjacent to at least one battery module, from the first inter-module path such that the air flows in the inter-cell paths of a plurality of the battery modules arranged next to the first inter-module path and adjacent each other.

2. A power source apparatus comprising:
a battery module including a plurality of battery cells;
a housing forming a housing chamber to house and arrange a plurality of the battery modules in parallel;
a blower to blow air;
a chassis storing the housing and the blower;
an inter-module path formed between the battery modules adjacent to each other; and
an inter-cell path formed between the battery cells adjacent to each other,
wherein the inter-module path and the inter-cell path are arranged inside the housing,
wherein the housing includes:
an intake portion to take the air into the housing chamber, the air being blown from the blower; and
a sending portion to send the air from the housing chamber, the air being taken from the intake portion and passing through the inter-module path and the inter-cell path,
wherein the intake portion takes, into the housing chamber, the air being present inside the chassis and outside the housing,
wherein the sending portion sends the air present in the housing chamber to outside of the housing inside the chassis,
wherein the inter-module path has
a second inter-module path serving as a path into which the air is introduced, the air being to be introduced to the sending portion after passing through the inter-cell path,
and wherein the intake portion is separated, adjacent to at least one battery module, from the second inter-module path such that the airs having passed through the inter-cell path of each of a plurality of the battery modules arranged next to the second inter-module path and adjacent each other are confluent and introduced to the intake portion.

3. The power source apparatus according to claim 2,
wherein the sending portion is communicated with the second inter-module path.

4. A power source apparatus comprising:
a battery module including a plurality of battery cells;
a housing forming a housing chamber to house and arrange a plurality of the battery modules in parallel;
a blower to blow air;
a chassis storing the housing and the blower;
an inter-module path formed between the battery modules adjacent to each other; and
an inter-cell path formed between the battery cells adjacent to each other,
wherein the inter-module path and the inter-cell path are arranged inside the housing,
wherein the housing includes:
an intake portion to take the air into the housing chamber, the air being blown from the blower; and
a sending portion to send the air from the housing chamber, the air being taken from the intake portion and passing through the inter-module path and the inter-cell path,
wherein the intake portion takes, into the housing chamber, the air being present inside the chassis and outside the housing,
wherein the sending portion sends the air present in the housing chamber to outside of the housing inside the chassis,
wherein the inter-module path has:
a first inter-module path serving as a path into which the air is introduced, the air being taken from the intake portion and not yet having passed through the inter-cell path; and
a second inter-module path serving as a path into which the air is introduced, the air being introduced to the sending portion after passing through the inter-cell path,
wherein the intake portion includes
a first intake portion disposed on a side opposed to the sending portion and facing the first inter-module path,
and wherein the sending portion sends the air taken from the first intake portion and passing through the first inter-module path, the inter-cell path, and the second inter-module path in turn.

5. The power source apparatus according to claim 2,
wherein the intake portion includes
a second intake portion disposed on an end portion of the plurality of battery modules in a direction of parallel arrangement and facing the inter-cell path,
and wherein the sending portion sends the air taken from the second intake portion and passing through the inter-cell path and the second inter-module path in turn.

6. The power source apparatus according to claim 4,
wherein the intake portion includes
a second intake portion disposed on an end portion of the plurality of battery modules in a direction of parallel arrangement and facing the inter-cell path,
and wherein the sending portion sends the air taken from the second intake portion and passing through the inter-cell path and the second inter-module path in turn.

7. The power source apparatus according to claim 4, wherein the first intake portion is arranged separating from the sending portion in a direction of parallel arrangement of the plurality of battery modules.

8. The power source apparatus according to claim 1, comprising:
wherein the chassis having has an inner space surrounded by a plurality of wall surfaces including a first lateral wall surface and a second lateral wall surface, the chassis storing the housing in the inner space,
the first lateral wall surface being disposed on a first side of the battery module and opposed to the intake portion,
the second lateral wall surface being arranged on a side opposite to the first side of the battery module and being opposed to the first lateral wall surface,
the power source apparatus further comprising:
an intake chamber formed between the second lateral wall surface and the housing, the intake chamber being configured to take the air that is taken by the blower after being sent from the sending portion;
a partition plate included in the housing, the partition plate separating the housing chamber from the intake chamber and forming the sending portion; and
a first sealing member to seal between the second lateral wall surface and a portion of the partition plate, the portion being arranged closer to the second lateral wall surface and not forming the sending portion.

9. The power source apparatus according to claim 2, comprising:
wherein the chassis having has an inner space surrounded by a plurality of wall surfaces including a first lateral wall surface and a second lateral wall surface, the chassis storing the housing in the inner space,
the first lateral wall surface being disposed on a first side of the battery module and opposed to the intake portion,
the second lateral wall surface being arranged on a side opposite to the first side of the battery module and being opposed to the first lateral wall surface,
the power source apparatus further comprising:
an intake chamber formed between the second lateral wall surface and the housing, the intake chamber being configured to take the air that is taken by the blower after being sent from the sending portion;
a partition plate included in the housing, the partition plate separating the housing chamber from the intake chamber and forming the sending portion; and
a first sealing member to seal between the second lateral wall surface and a portion of the partition plate, the portion being arranged closer to the second lateral wall surface and not forming the sending portion.

10. The power source apparatus according to claim 4, comprising:
wherein the chassis having has an inner space surrounded by a plurality of wall surfaces including a first lateral wall surface and a second lateral wall surface, the chassis storing the housing in the inner space,
the first lateral wall surface being disposed on a first side of the battery module and opposed to the intake portion,
the second lateral wall surface being arranged on a side opposite to the first side of the battery module and being opposed to the first lateral wall surface,
the power source apparatus further comprising:
an intake chamber formed between the second lateral wall surface and the housing, the intake chamber being configured to take the air that is taken by the blower after being sent from the sending portion;
a partition plate included in the housing, the partition plate separating the housing chamber from the intake chamber and forming the sending portion; and
a first sealing member to seal between the second lateral wall surface and a portion of the partition plate, the portion being arranged closer to the second lateral wall surface and not forming the sending portion.

11. The power source apparatus according to claim 5, comprising:
a chassis having an inner space surrounded by a plurality of wall surfaces including a first lateral wall surface, a first vertical wall surface, a second lateral wall surface, and a second vertical wall surface and storing the housing in the inner space,
the first lateral wall surface being arranged on a first side of the battery module,
the first vertical wall surface being connected to the first lateral wall surface and extending toward the housing,
the second lateral wall surface being arranged on a side opposite to the first side of the battery module and being opposed to the first lateral wall surface,
the second vertical wall surface being opposed to the first vertical wall surface;
an intake chamber formed between the second lateral wall surface and the housing, the intake chamber being configured to take the air that is taken by the blower after being sent from the sending portion;
a partition plate included in the housing, the partition plate separating the housing chamber from the intake chamber and forming the sending portion;
a first side plate standing up from one edge portion of the partition plate and being included in the housing;
a second side plate standing up from the other edge portion of the partition plate and being included in the housing, the other edge portion being opposed to the one edge portion; and
a second sealing member to seal between the first side plate and the first vertical wall surface and between the second side plate and the second vertical wall surface,
wherein the second intake portion is arranged between the first side plate and the second side plate.

12. A power source apparatus comprising:
a plurality of batteries;
a housing forming a housing chamber to house the batteries and having:
an intake portion to take air into the housing chamber; and
a sending portion to send air;
a chassis having an inner space surrounded by a plurality of wall surfaces including a first lateral wall surface and a second lateral wall surface and storing the housing in the inner space,
the first lateral wall surface being arranged on a first side of the batteries,
the second lateral wall surface being arranged on a side opposite to the first side of the batteries and being opposed to the first lateral wall surface;
a blower arranged between the second lateral wall surface and the batteries and configured to blow the air that is taken from the intake portion,
wherein the intake portion opens toward the first lateral wall surface of the chassis and takes, into the housing chamber, the air being present inside the chassis and outside the housing, wherein the sending portion opens toward the second lateral wall surface of the chassis and sends the air present in the housing chamber to outside of the housing inside the chassis, wherein the blower is arranged between the first lateral wall surface and the second lateral wall surface in the inner space of the chassis, and wherein at least a part of the sending portion is arranged separating from the blower in a perpendicular direction that is perpendicular to a direction of arrangements of the blower and the batteries so as not to be overlapped with the blower in the direction of arrangements.

13. The power source apparatus according to claim 12, wherein the sending portion includes a first sending portion and a second sending portion arranged at intervals in the perpendicular direction, and wherein the blower is arranged between the housing and the second lateral wall surface and between the first sending portion and the second sending portion in the perpendicular direction.

14. A working machine comprising:

a machine body;

an operation device disposed on the machine body;

a rotating electrical apparatus to generate a motive power used for driving the operation device; and a power source apparatus to supply an electric power to the rotating electrical apparatus, the power source apparatus having a configuration according to claim 1.

15. The power source apparatus according to claim 4, wherein the first intake portion is constituted of an enlarged opening portion formed larger than another opening portion that is not opposed to the first inter-module path.

16. The power source apparatus according to claim 1, comprising a heat exchanger arranged in an inner space of the chassis and configured to cool, in a heat exchanging method, the air flowing in the inner space.

17. The power source apparatus according to claim 2, comprising a heat exchanger arranged in an inner space of the chassis and configured to cool, in a heat exchanging method, the air flowing in the inner space.

18. The power source apparatus according to claim 12, comprising a heat exchanger arranged in the inner space of the chassis and configured to cool, in a heat exchanging method, the air flowing in the inner space.

19. The power source apparatus according to claim 4, wherein the first inter-module path faces the intake portion and does not face the sending portion, and wherein the second inter-module path faces the sending portion and does not face the intake portion.

\* \* \* \* \*